United States Patent
Watanabe

(10) Patent No.: US 8,472,114 B2
(45) Date of Patent: Jun. 25, 2013

(54) DISPLAY DEVICE

(75) Inventor: Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 127 days.

(21) Appl. No.: 13/139,733

(22) PCT Filed: Dec. 14, 2009

(86) PCT No.: PCT/JP2009/006856
§ 371 (c)(1),
(2), (4) Date: Jun. 15, 2011

(87) PCT Pub. No.: WO2010/070871
PCT Pub. Date: Jun. 24, 2010

(65) Prior Publication Data
US 2011/0242686 A1    Oct. 6, 2011

(30) Foreign Application Priority Data
Dec. 18, 2008  (JP) .................................. 2008-322964

(51) Int. Cl.
*G03B 21/56* (2006.01)
(52) U.S. Cl.
USPC .......................................... 359/443; 359/449
(58) Field of Classification Search
USPC .................. 359/443, 449, 454, 290–291, 804
See application file for complete search history.

(56) References Cited

U.S. PATENT DOCUMENTS

| | | | |
|---|---|---|---|
| 6,483,482 B1 | 11/2002 | Kim | |
| 6,927,908 B2 | 8/2005 | Stark | |
| 2009/0102862 A1* | 4/2009 | Miller | 345/634 |
| 2011/0109535 A1 | 5/2011 | Watanabe et al. | |

FOREIGN PATENT DOCUMENTS

| | | |
|---|---|---|
| JP | 05-188873 A | 7/1993 |
| JP | 2001-005414 A | 1/2001 |
| JP | 2003-157031 A | 5/2003 |
| JP | 2004-524551 A | 8/2004 |
| WO | 2008/149449 A1 | 12/2008 |

OTHER PUBLICATIONS

English translation of Official Communication issued in corresponding International Application PCT/JP2009/006856, mailed on Jul. 14, 2011.

* cited by examiner

*Primary Examiner* — James Jones
(74) *Attorney, Agent, or Firm* — Keating & Bennett, LLP

(57) ABSTRACT

A direct-viewing type display device 100a includes a display panel 100 having a display region 120 including pixels arrayed in a row direction and a column direction and a frame region 130 provided outside the display region, such that a first border line B1 and a second border line B2 exist between the display region and the frame region; and a light-transmitting cover 200 disposed on the viewer's side. The display region includes a peripheral display region 125 and a central display region 124; a third border line B3 and a fourth border line B4 exist between the peripheral display region and the central display region; the peripheral display region includes a first peripheral display section 121; the light-transmitting cover includes a lens portion disposed over the peripheral display region and the frame region; and the lens portion refracts light going out from a pixel 171 within the first peripheral display section in a direction X1 from a point where the third border line and the fourth border line intersect toward the pixel 171. According to the present invention, a display device is provided whose entire frame region including the corner portions can be obscured, such that joints can be obscured in the case of tiling.

11 Claims, 19 Drawing Sheets

FIG.1
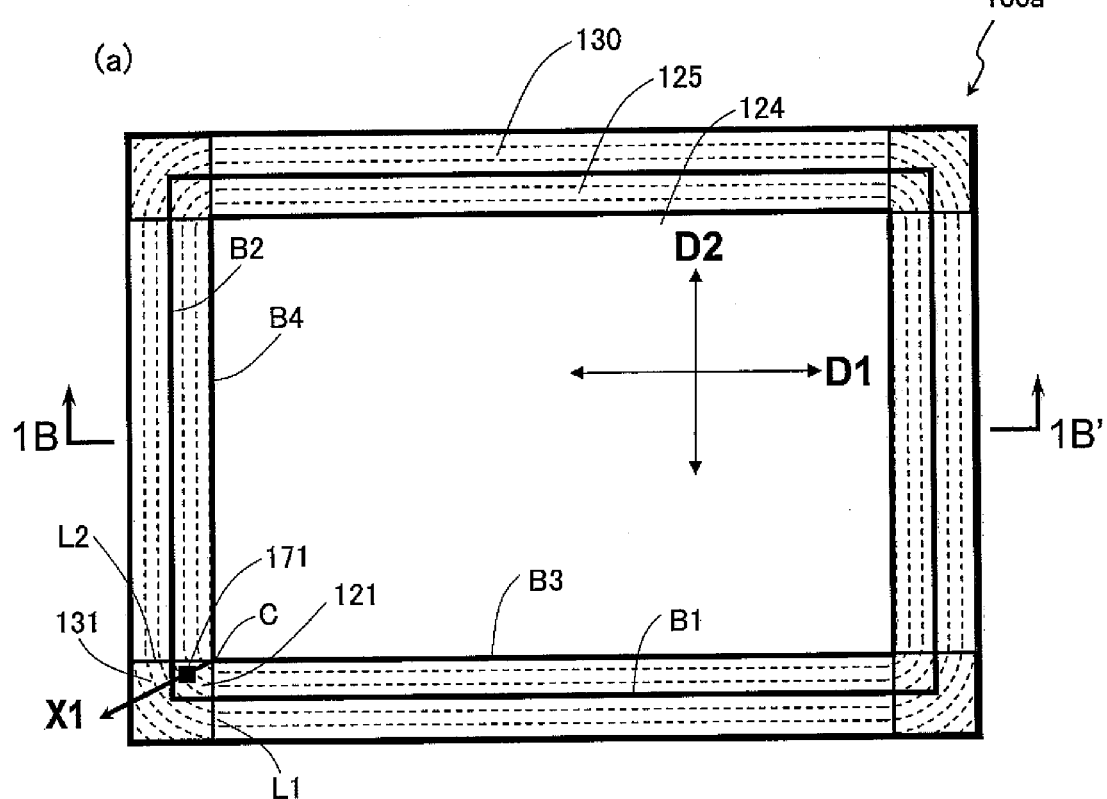
(a)
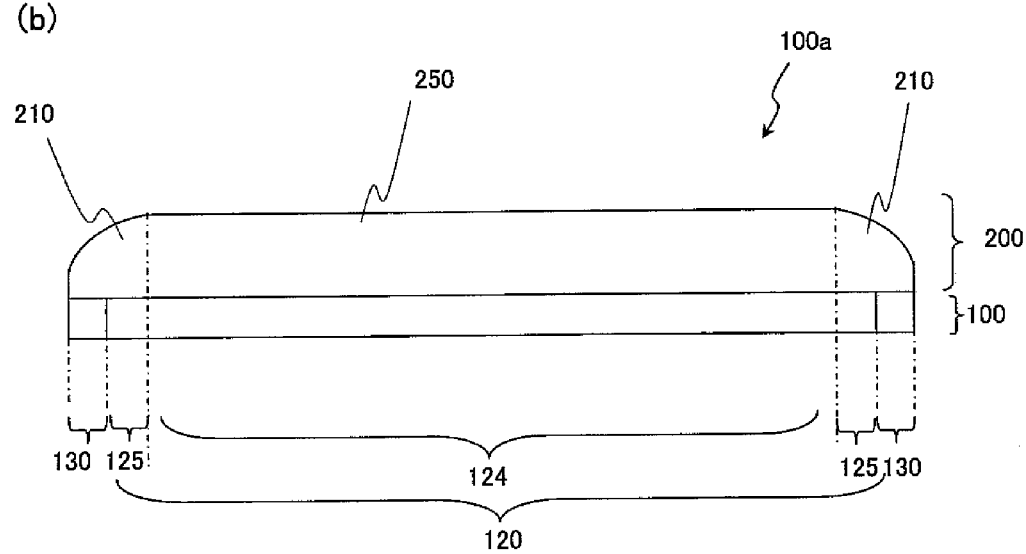
(b)

FIG.11
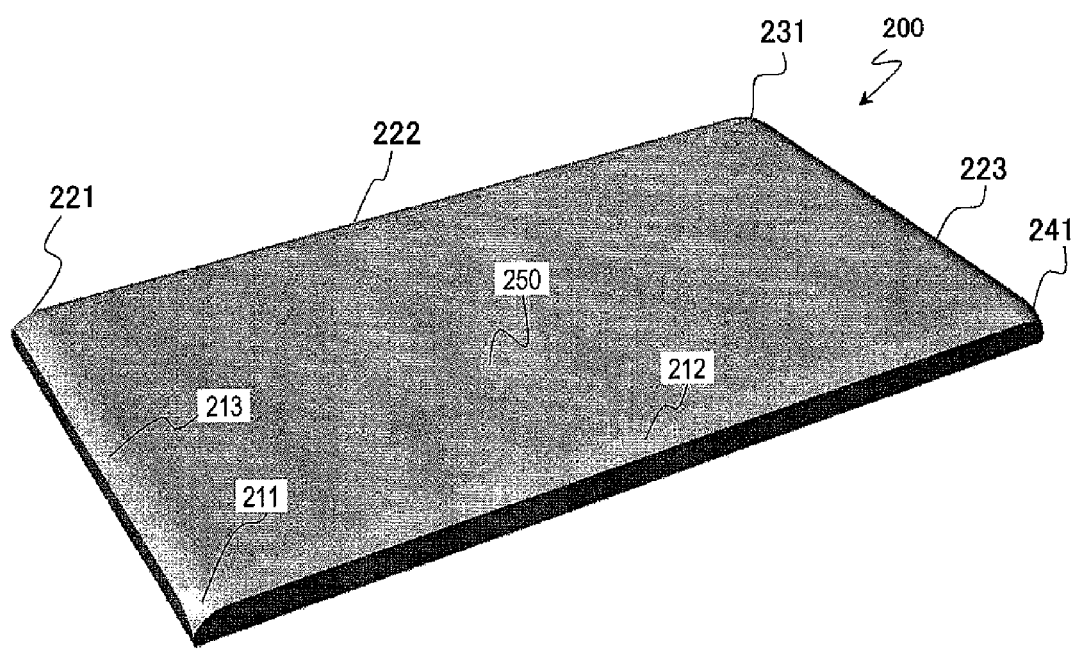
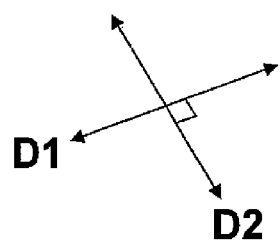

FIG. 17
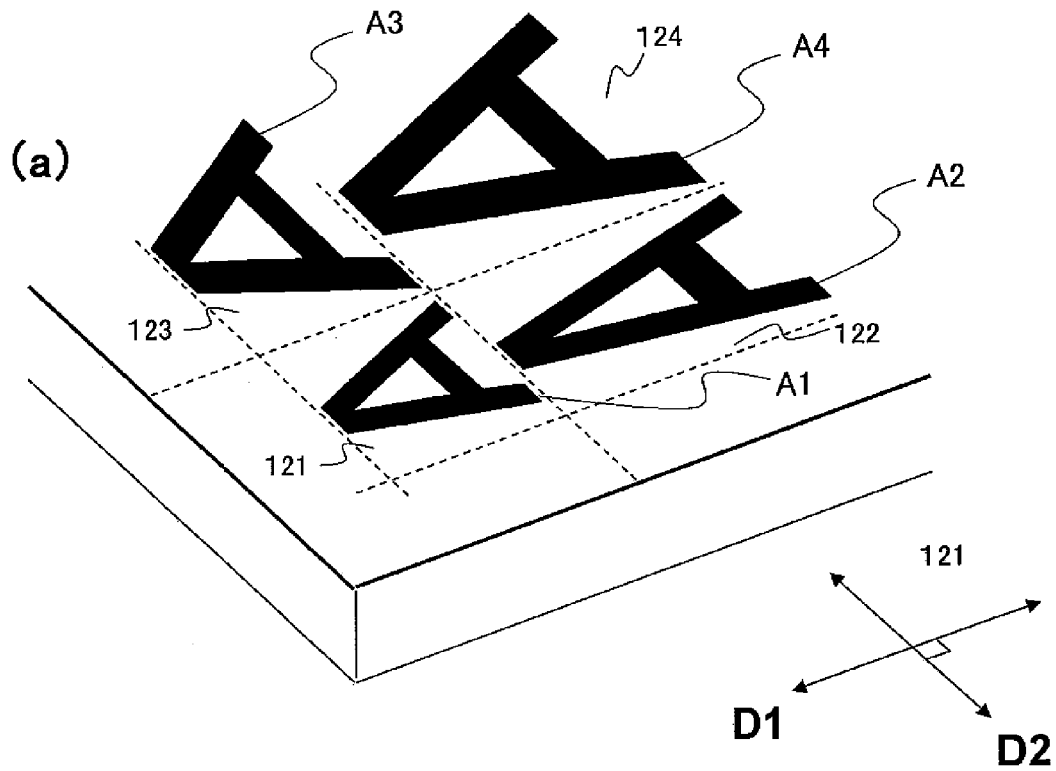
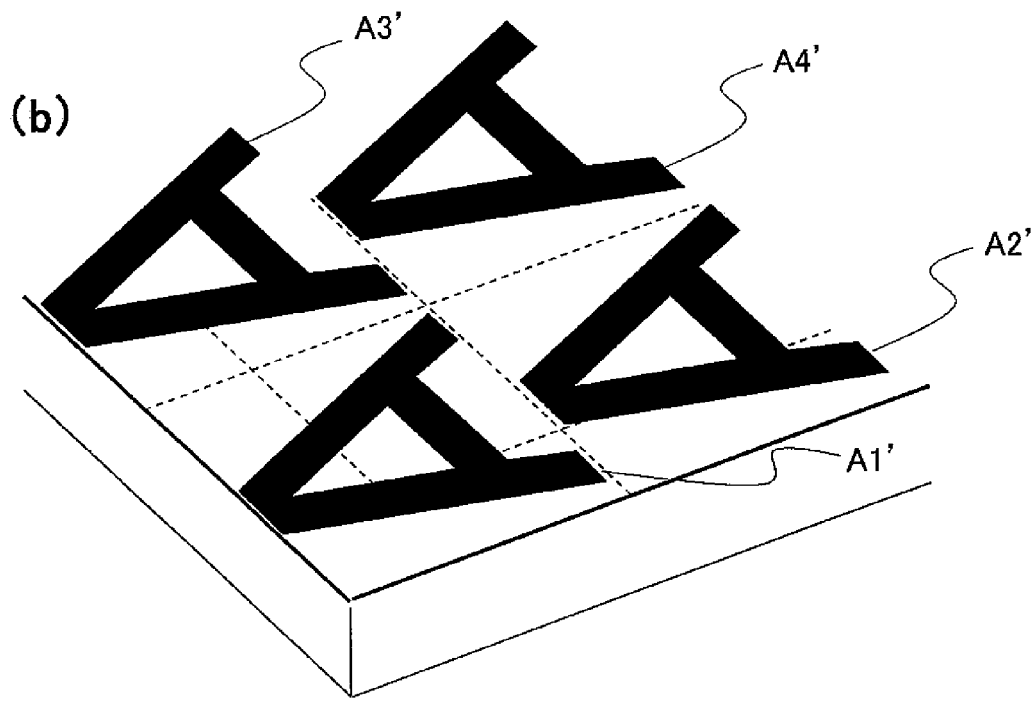

DISPLAY DEVICE

TECHNICAL FIELD

The present invention relates to a display device, and more particularly to a direct-viewing type display device.

BACKGROUND ART

Conventionally, in television sets and display devices for displaying information, attempts of arraying a plurality of display devices (which may be referred to as a tiling technique) to realize a pseudo large-screen display device are being made. However, using the tiling technique has a problem of visible joints between the plurality of display devices.

This problem will be described by taking a liquid crystal display device for example. A liquid crystal display device includes a liquid crystal display panel, a backlight device, circuits for supplying various electrical signals to the liquid crystal display panel, and a power supply, as well as a housing in which to accommodate these. The liquid crystal display panel includes a pair of glass substrates and a liquid crystal layer provided between them. On one of the pair of glass substrates, pixel electrodes, TFTs, and bus lines are formed, for example. On the other glass substrate, a color filter layer and a counter electrode are formed. Moreover, the liquid crystal display panel has a display region in which a plurality of pixels are arrayed, and a frame region around it. In the frame region, a sealing portion for ensuring that the pair of substrates oppose each other and also sealing and retaining the liquid crystal layer, an implementation of driving circuitry for driving the pixels, and the like are provided.

Since no pixels are arrayed in the frame region, the frame region does not contribute to displaying. Therefore, when a large screen is constructed by arraying a plurality of liquid crystal display panels, joints will occur in the image. This problem is not limited to liquid crystal display devices, but is a problem common to direct-viewing type display devices, e.g., PDPs, organic EL display devices, and electrophoresis display devices.

Patent Documents 1 and 2 disclose display devices for displaying an image which is free of display panel joints. The display devices described in Patent Documents 1 and 2 include a light-transmitting cover on the viewer's side of the display panel. An edge portion of the light-transmitting cover includes a portion where its viewer's side surface is curved. The curved portion functions as a lens, and therefore will be referred to as a "lens portion" hereinafter. The lens portion of the light-transmitting cover is provided so as to overlap the frame region of the display panel and a portion of a region of the display region adjoining the frame region. A portion of the display region that overlaps the lens portion will be referred to as a "peripheral display region". Light which goes out from pixels which are arrayed in the peripheral display region is refracted by the lens portion toward the frame region. As a result, an image is also displayed on the front face of the frame region, so that a jointless image is displayed on the entire screen.

CITATION LIST

Patent Literature

[Patent Document 1] Japanese Laid-Open Patent Publication No. 5-188873

[Patent Document 2] Japanese National Phase PCT Laid-Open Publication No. 2004-524551

SUMMARY OF INVENTION

Technical Problem

However, the conventional techniques described in Patent Document 1 and Patent Document 2 are meant to realize jointless displaying by using a display device which is tiled in either direction of the horizontal direction or vertical direction. Even if the techniques described in Patent Document 1 and Patent Document 2 are applied in constructing a display device in which display devices are used for tiling in the two directions of the vertical direction and horizontal direction, jointless displaying cannot be achieved. With reference to FIG. 20, this problem will be described by taking a display device in which four display devices are used for a 2×2 matrix tiling in two directions as an example.

FIG. 20 is an upper plan view of a display device 300A, which is tiled with four display devices 300a. Each display device 300a has a display region 320 and a frame region 330. In the display device 300A, by applying the techniques described in Patent Document 1 and Patent Document 2, non-display regions 339 (shown hatched with lines ascending toward the right in FIG. 20) which are formed near the boundaries at which the four display devices 300a adjoin along the vertical direction or the horizontal direction can be obscured. However, according to the techniques described in Patent Document 1 and Patent Document 2, non-display regions 338 (shown hatched with lines descending toward the right in FIG. 20) which are present in corner portions that lie in neither the vertical direction nor the horizontal direction from the display regions cannot be obscured.

The present invention has been made in view of the above problems, and an objective thereof is to provide a direct-viewing type display device which can display a jointless image even when tiled in two directions with a plurality of display panels.

Solution to Problem

A direct-viewing type display device according to the present invention comprises: at least one display panel having a display region including a matrix array of a plurality of pixels arranged along a row direction and a column direction and a frame region provided outside the display region, such that a first border line extending along the row direction and a second border line intersecting the first border line and extending along the column direction exist between the display region and the frame region; and at least one light-transmitting cover disposed on a viewer's side of the at least one display panel, wherein, the display region is composed of a peripheral display region adjoining the frame region and a central display region, the central display region defining a region other than the peripheral display region; a third border line extending along the row direction and a fourth border line intersecting the third border line and extending along the column direction exist between the peripheral display region and the central display region; the peripheral display region includes a first peripheral display section surrounded by a straight line passing through a point where the third border line and the fourth border line intersect and orthogonally intersecting the first border line, a straight line passing through the intersecting point and orthogonally intersecting the second border line, the first border line, and the second border line; and the at least one light-transmitting cover includes a lens portion disposed over the peripheral display region and the frame region, the lens portion allowing light going out from at least one pixel within the first peripheral display section to be refracted in a direction from the intersecting point toward the at least one pixel.

In one embodiment, the frame region includes a first frame portion surrounded by a straight line passing through the intersecting point and orthogonally intersecting the first border line, a straight line passing through the intersecting point and orthogonally intersecting the second border line, the first border line, the second border line, and an outer edge of the frame region; the lens portion includes a first lens body disposed over the first peripheral display section and the first frame portion; and the first lens body is a portion of a solid obtained by cutting a body of revolution in two planes containing an axis of revolution, the axis of revolution passing through the intersecting point and being perpendicular to the third border line and the fourth border line.

In one embodiment, the first lens body refracts light in such a manner that, among a plurality of pixels within the first peripheral display section, light going out from a plurality of pixels which are on a straight line passing through the intersecting point and the at least one pixel goes out from a viewer-side surface of the first lens body at positions which are at substantially equal intervals.

In one embodiment, a line of intersection between a plane passing through the intersecting point and the at least one pixel and being perpendicular to a display plane of the at least one display panel and a surface of the first lens body is a curve defined by an aspherical function.

In one embodiment, in the display region, the plurality of pixels are arrayed at equal intervals along the row direction and the column direction; and a display signal supplied to the at least one pixel is uniformly compressed along a direction passing through the intersecting point and being perpendicular to the first border line and along a direction passing through the intersecting point and being perpendicular to the second border line, as compared to a display signal supplied to a pixel within the central display region.

In one embodiment, the peripheral display region further includes: a second peripheral display section adjoining the first peripheral display section, the first border line, and the third border line; and a third peripheral display section adjoining the first peripheral display section, the second border line, and the fourth border line; the frame region further includes a second frame portion adjoining the first frame portion and the first border line, and a third frame portion adjoining the first frame portion and the second border line; the lens portion further includes a second lens body disposed over the second peripheral display section and the second frame portion, and a third lens body disposed over the third peripheral display section and the third frame portion; the second lens body allows light going out from a plurality of pixels within the second peripheral display section to be refracted in a direction from the second peripheral display section toward the second frame portion; and the third lens body allows light going out from a plurality of pixels within the third peripheral display section to be refracted in a direction from the third peripheral display section toward the third frame portion.

In one embodiment, the second lens body refracts light in such a manner that light going out from a plurality of pixels within the second peripheral display section goes out from a viewer-side surface of the second lens body at positions which are at substantially equal intervals; and the third lens body refracts light in such a manner that light going out from a plurality of pixels within the third peripheral display section goes out from a viewer-side surface of the third lens body at positions which are at substantially equal intervals.

In one embodiment, a line of intersection between a surface of the second lens body and a plane perpendicular to the first border line and a line of intersection between a surface of the third lens body and a plane perpendicular to the second border line is a curve defined by a same function as a line of intersection between a surface of the first lens body and a plane perpendicular to a display plane of the at least one display panel.

In one embodiment, the at least one light-transmitting cover further includes a flat plate portion in a portion other than the lens portion, a viewer-side surface of the flat plate portion being composed of a face which is substantially parallel to a display plane of the at least one display panel; and a thickness of the flat plate portion is smaller than a thickness of the lens portion.

In one embodiment, the at least one display panel includes two or more display panels adjoining one another along the row direction; the at least one light-transmitting cover includes two or more light-transmitting covers adjoining one another along the row direction; and the third lens bodies of the two or more light-transmitting covers adjoin one another along the row direction.

In one embodiment, the at least one display panel includes four or more display panels adjoining one another along the row direction and the column direction; the at least one light-transmitting cover includes four or more light-transmitting covers adjoining one another along the row direction and the column direction; and the first lens bodies of the four or more light-transmitting covers adjoin one another.

In one embodiment, the two or more display panels are set so that an angle between any adjoining display planes along the row direction is an angle less than 180°.

In one embodiment, the frame region includes a second frame portion adjoining the first frame portion and the first border line and a third frame portion adjoining the first frame portion and the second border line; a width of the second frame portion along a direction perpendicular to the first border line is greater than a width of the third frame portion along a direction perpendicular to the second border line; and, of the first lens body, a length of an outer edge of a cross section in a plane passing through the intersecting point and being perpendicular to the first border line is smaller than a length of an outer edge of a cross section in a plane passing through the intersecting point and being perpendicular to the second border line.

In one embodiment, given a compression rate a (0<a<1) of the display signal, a conic constant k of the aspherical function substantially conforms to the equation $k=89.918a^4-194.57a^3+159.82a^2-57.099a+7.1865$.

In one embodiment, a conic constant k of the aspherical function has a value 1.46.

In one embodiment, a display signal supplied to a pixel within the second peripheral display section is uniformly compressed along a direction perpendicular to the row direction by the compression rate a as compared to a display signal supplied to a pixel within the central display region, and a display signal supplied to a pixel within the third peripheral display section is uniformly compressed along a direction perpendicular to the column direction by the compression rate a as compared to a display signal supplied to a pixel within the central display region.

In one embodiment, a viewer-side surface, and a surface opposite to the viewer's side, of the lens portion are curved surfaces.

In one embodiment, a line of intersection between a viewer-side surface of the second lens body and a plane perpendicular to the first border line and a line of intersection between a viewer-side surface of the third lens body and a plane perpendicular to the second border line are curves defined by an aspherical function.

Advantageous Effects of Invention

According to the present invention, there is provided a direct-viewing type display device which can display a jointless image even when tiled in two directions with a plurality of display devices.

BRIEF DESCRIPTION OF DRAWINGS

[FIG. 1] (a) is a schematic upper plan view of a liquid crystal display device 100a according to an embodiment of the present invention; and (b) is a cross-sectional view of the liquid crystal display device 100a along line 1B-1B' in (a).

[FIG. 3] A schematic cross-sectional view of an edge portion of the liquid crystal display device 100a.

[FIG. 6] A schematic perspective view of an edge portion of the liquid crystal display device 100a.

[FIG. 10] A diagram showing a result of a ray-tracing simulation in an X1-Y1 cross section of the liquid crystal display device 100a.

[FIG. 11] A schematic perspective view of a light-transmitting cover 200.

[FIG. 12] A schematic perspective view of an edge portion of the liquid crystal display device 100a.

[FIG. 15] A diagram showing a result of a ray-tracing simulation in an X2-Y2 cross section of the liquid crystal display device 100a.

[FIG. 16] A diagram showing a result of a ray-tracing simulation in an X3-Y3 cross section of the liquid crystal display device 100a.

[FIG. 17] (a) shows an image which is formed in a display region of a liquid crystal display panel; and (b) shows an image which is displayed on the viewer's side of a light-transmitting cover.

DESCRIPTION OF EMBODIMENTS

Figure 2:
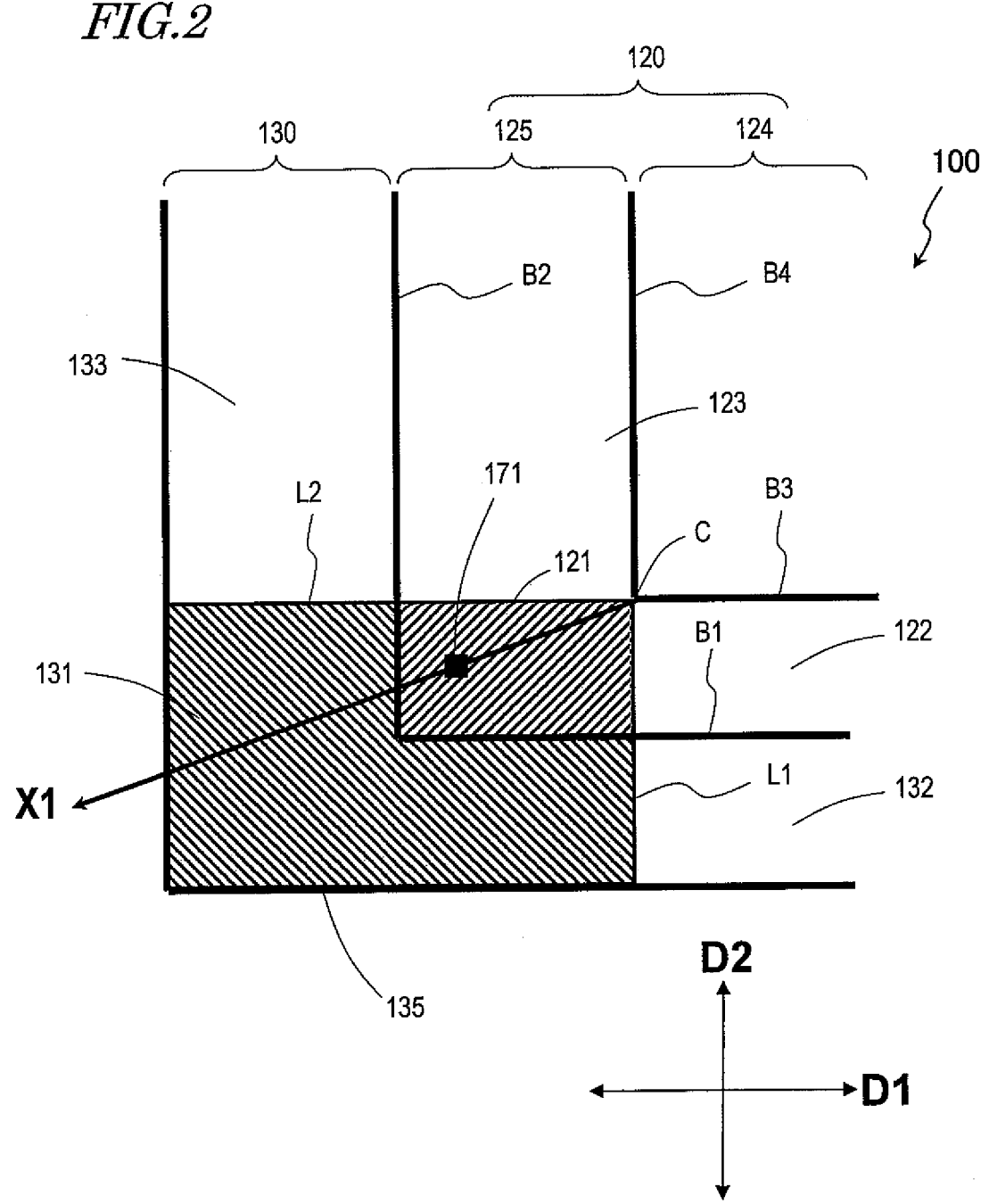
[FIG. 2] A schematic upper plan view of an edge portion of a liquid crystal display panel 100.

Hereinafter, an embodiment of the present invention will be described with reference to the drawings. However, the present invention is not limited to the illustrated embodiment.

FIG. 1 schematically shows a direct-viewing type liquid crystal display device 100a according to an embodiment of the present invention. FIG. 1(a) is a schematic upper plan view of the liquid crystal display device 100a as seen from the viewer's side, and FIG. 1(b) is a schematic cross-sectional view along line 1B-1B' in FIG. 1(a).

As shown in FIGS. 1(a) and (b), the liquid crystal display device 100a includes a liquid crystal display panel 100 and a light-transmitting cover 200 which is provided on the viewer's side of the liquid crystal display panel 100. The liquid crystal display panel 100 includes a display region 120 in which a plurality of pixels are arranged in a matrix array having rows and columns, and a frame region 130 provided outside the display region 120. The display region 120 is composed of a peripheral display region 125 adjoining the frame region 130 and a central display region 124 which is any region other than the peripheral display region 125. The light-transmitting cover 200 includes a flat plate portion 250 and a lens portion 210.

The peripheral display region 125 of the liquid crystal display panel 100 refers to a region within the display region 120 where the lens portion 210 of the light-transmitting cover 200 is disposed on the viewer's side, while the flat plate portion 250 is disposed over the central display region 124. By allowing light going out from the peripheral display region 125 to be refracted by the lens portion 210, an image which is formed in the peripheral display region 125 is enlarged onto the region that is composed of the peripheral display region 125 and the frame region 130.

Now, when the row direction is designated as a first direction D1 and the column direction as a second direction D2, between the display region 120 and the frame region 130, there exist a first border line B1 extending along the first direction D1 and a second border line B2 intersecting the first border line B1 and extending along the second direction D2. Between the peripheral display region 125 and the central display region 124, there exist a third border line B3 extending along the first direction D1 and a fourth border line B4 intersecting the third border line B3 and extending along the second direction D2.

The peripheral display region 125 includes a first peripheral display section 121, which is surrounded by: a straight line L1 passing through a point C at which the third border line B3 and the fourth border line B4 intersect and orthogonally intersecting the first border line B1; a straight line L2 passing through the point C and orthogonally intersecting the second border line B2; the first border line B1; and the second border line B2.

The frame region 130 includes a first frame portion 131 which adjoins the first peripheral display section 121 at the first border line B1 or the second border line B2. The first frame portion 131 is a portion which is defined by the first border line B1, the second border line B2, the straight line L1 and the straight line L2, and the outer edge of the liquid crystal display panel 100.

The lens portion 210 of the light-transmitting cover 200 has a surface which is curved as shown in FIG. 1(b). In FIG. 1(a), contour lines are employed to illustrate how the surface (viewer-side surface) of the lens portion 210 is curved. Although the contour lines herein are at constant intervals for simplicity, this is not a limitation. The preferable shape of the viewer-side surface of the lens portion 210 will be described in detail later.

The lens portion 210 of the light-transmitting cover 200 of the liquid crystal display device 100a according to an embodiment of the present invention refracts light going out from the first peripheral display section 121, thereby enlarging an image which is formed in the first peripheral display section 121 onto a region that is composed of the first peripheral display section 121 and the first frame portion 131. Specifically, as shown in FIG. 1(a), the lens portion 210 allows light going out from a pixel 171 within the first peripheral display section 121 to be refracted in a direction X1 from the point C toward the pixel 171. Similarly, light going out from each pixel in the first peripheral display section 121 is refracted in the direction from the point C toward that pixel. When the image is observed from a direction perpendicular to the display plane of the liquid crystal display device 100a, the image which is formed in the first peripheral display section 121 of the liquid crystal display panel 100 is displayed with enlargement in the region composed of the first peripheral display section 121 and the first frame portion 131. That is, the portion of the lens portion 210 that is disposed over the first peripheral display section 121 and the first frame portion 131 refracts light going out from the first peripheral display section 121 in a direction (e.g., X1) which is neither the horizontal direction D1 nor the vertical direction D2, thereby obscuring the first frame portion 131.

Hereinafter, this will be described in more detail with reference to FIG. 2 and FIG. 3.

FIG. 2 is an upper plan view schematically showing, enlarged, the neighborhood of a corner portion of the liquid crystal display panel 100. As shown in FIG. 2, the first border line B1 and the second border line B2 exist between the display region 120 and the frame region 130, whereas the third border line B3 and the fourth border line B4 exist between the peripheral display region 125 and the central display region 124. The first peripheral display section 121 is a portion surrounded by the straight line L1, the straight line L2, the first border line B1, and the second border line B2. The first frame portion 131 is a portion within the frame region 130 that is surrounded by the straight line L1, the straight line L2, the first border line B1, the second border line B2, and the outer edge 135 of the frame region 130.

Figure 3:
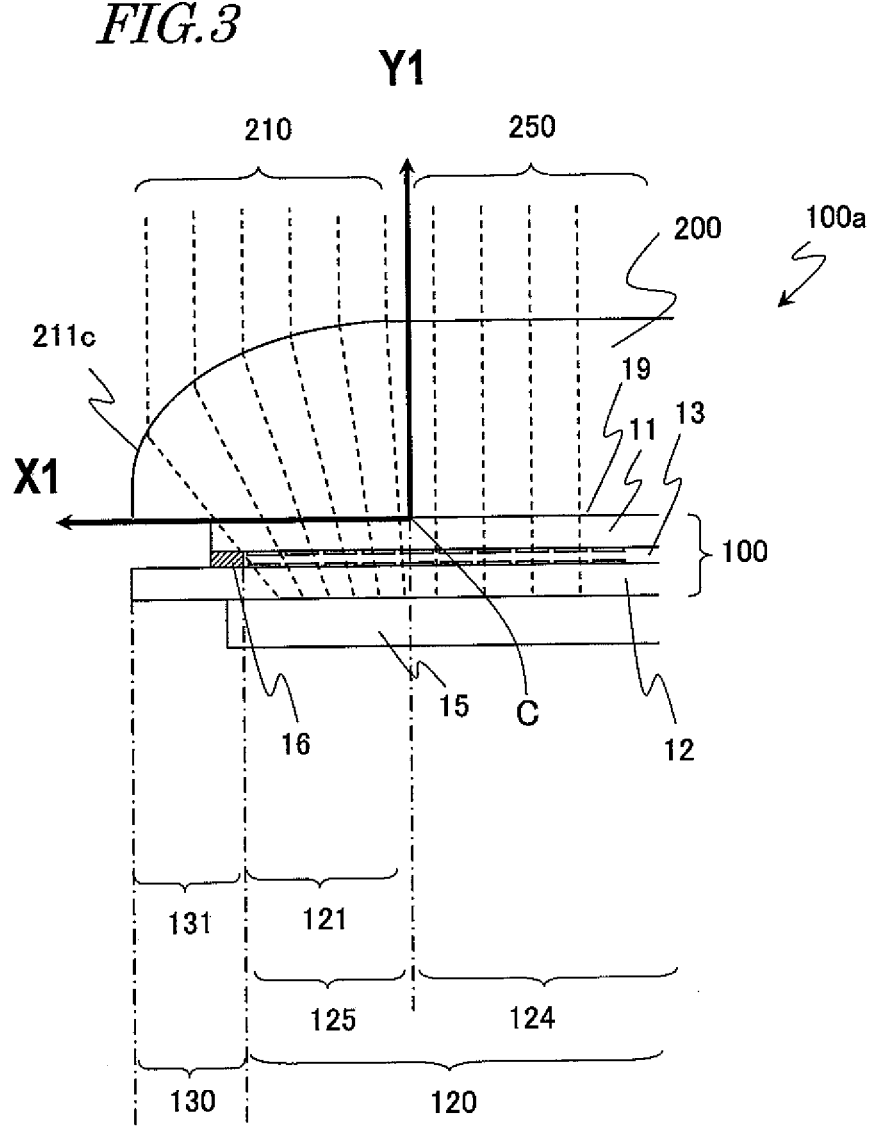

Next, FIG. 3 is referred to. FIG. 3 is a cross-sectional view of the liquid crystal display device 100a in an X1-Y1 plane. Herein, the Y1 axis is an axis which passes through the point C shown in FIG. 2 and which is perpendicular to the display plane 19 of the liquid crystal display panel 100.

The liquid crystal display panel 100, which may be any known liquid crystal display panel, includes an upper substrate 11 and a lower substrate 12, with a liquid crystal layer 13 provided between the upper substrate 11 and the lower substrate 12. TFTs and pixel electrodes are provided on the lower substrate 12, for example; and color filter layer and a counter electrode are provided on the upper substrate 11, for example. As necessary, polarizers are provided above the upper substrate 11 and below the lower substrate 12. In the frame region 130 of the liquid crystal display panel 100, a sealing portion 16, driving circuitry, and the like are formed. A backlight device 15 is provided below the liquid crystal display panel 100. The backlight device 15 is a direct type backlight device having a plurality of fluorescent lamps which are parallel to one another, for example.

FIG. 3 shows rays going out from pixels arrayed in the display region 120 with broken lines. As shown in FIG. 3, light going out from any pixel within the first peripheral display section 121 enters the lens portion 210, and is refracted in the X1 direction. At this time, the light entering the lens portion 210 is refracted at the viewer-side surface (also referred to as an "outgoing face") of the lens portion 210, and goes out from the viewer-side surface of the lens portion 210 that is located over the first peripheral display section 121 and the first frame portion 131. Light going out from the viewer-side surface of the lens portion 210 travels straight in a direction perpendicular to the display plane 19. Therefore, when the image is observed from the direction perpendicular to the display plane of the liquid crystal display device 100a, the image which is formed in the first peripheral display section 121 of the liquid crystal display panel 100 is displayed with enlargement in the region composed of the first peripheral display section 121 and the first frame portion 131, so that the first frame portion 131 is invisible.

Since the liquid crystal display device 100a has the lens portion 210, which corresponds to the entire frame region 130 of the liquid crystal display panel 100, the frame region 130 can be entirely made invisible to the viewer. However, without being limited to this, only a portion (e.g., the first frame portion 131) of the frame region 130 may be made invisible. Portions other than the corner portions such as the first frame portion 131 may be obscured by any conventional method; however, it is preferable to use lens portions which are integrated into the light-transmitting cover 200.

Figure 4:
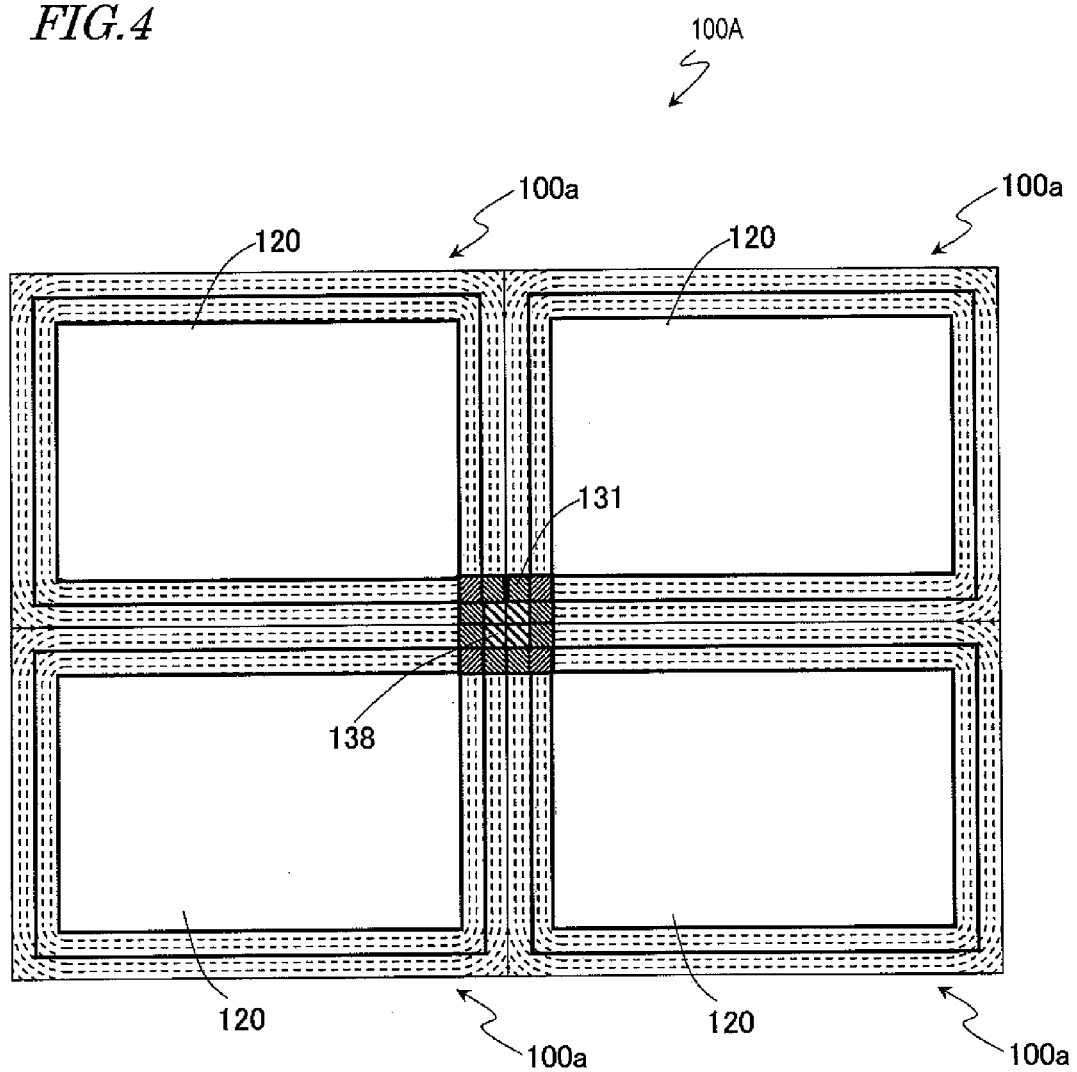
[FIG. 4] A schematic upper plan view of a liquid crystal display device 100A.

Next, a display device which is tiled with liquid crystal display devices 100a in two directions will be described. By deploying the liquid crystal display devices 100a for tiling in the two directions of the vertical direction and horizontal direction, a large-screen liquid crystal display device 100A shown in FIG. 4 can be obtained. Note that the tiling can be achieved through known methods. FIG. 4 is an upper plan view schematically showing a liquid crystal display device 100A in which liquid crystal display devices 100a are arrayed in 2×2 fashion (where × represents multiplication). In FIG. 4, contour lines are employed to illustrate the curved shape of the lens portion 210 of each liquid crystal display device 100a. In order to realize jointless displaying with the liquid crystal display device 100A, a non-display region 138 (shown with bold hatching in FIG. 4) which exists in a corner portion that is in neither the horizontal direction (first direction D1) nor the vertical direction (second direction D2) to the display region 120 of each liquid crystal display device 100a needs to be obscured.

As described above, in each liquid crystal display device 100a, the first frame portion 131 can be obscured. Since the non-display region 138 of the liquid crystal display device 100A is contained within the first frame portions 131 of the four liquid crystal display devices 100a, the non-display region 138 can be obscured in the liquid crystal display device 100A.

As described above, since the liquid crystal display device 100a shown in FIG. 1(a) includes the lens portion 210 corresponding to the entire frame region 130 of the liquid crystal display panel 100, the liquid crystal display device 100a can display a jointless image, while also obscuring any frame portion other than the portions creating joints. In this manner, the liquid crystal display device 100A can perform display with an even larger screen.

Although the above embodiment illustrates a liquid crystal display device in which a liquid crystal display panel is used as the display panel as an example, the display panel to be used for the display device according to an embodiment of the present invention is not limited thereto. As the display panel, a display panel for a PDP, an organic EL display panel, an electrophoresis display panel, or the like can also be used, for example. Instead of the liquid crystal display panel 100, a liquid crystal displaying unit in a housing accommodating the liquid crystal display panel 100 may also be used.

Moreover, as shown in FIGS. 1, 2, 3, and 4, the liquid crystal display panel 100 is illustrated as rectangular in the above embodiment, and the first direction D1 and the second direction D2 are illustrated as orthogonal. However, the shape of the liquid crystal display panel and the directions in which the pixels are arrayed are not limited thereto.

Moreover, FIG. 3 also illustrates rays going out from pixels within the central display region 124. The outgoing face of the flat plate portion 250 disposed over the central display region 124 is parallel to the display plane 19. Light going out from the central display region 124 enters the flat plate portion 250, travels straight through the flat plate portion 250 in a direction perpendicular to the display plane 19, and is emitted toward the viewer's side.

Next, a preferable shape for the portion of the lens portion 210 that is disposed over the first peripheral display section 121 and the first frame portion 131 will be described. Hereinafter, this portion will be referred to as a first lens body 211.

Preferably, the first lens body 211 is a portion of a solid which is obtained by cutting a body of revolution at two planes containing the axis of revolution. In this case, it is preferable that this portion of the body of revolution is placed so that the axis of revolution coincides with the Y1 axis. In other words, it is preferably placed so that its axis of revolution passes through the point C and is perpendicular to the third border line B3 and the fourth border line B4. In the present specification, a body of revolution is meant to be a solid body which is obtained by rotating a plane figure by 360° around a straight line which exists in the same plane as the plane figure. This straight line will be referred to as the axis of revolution.

Figure 5:
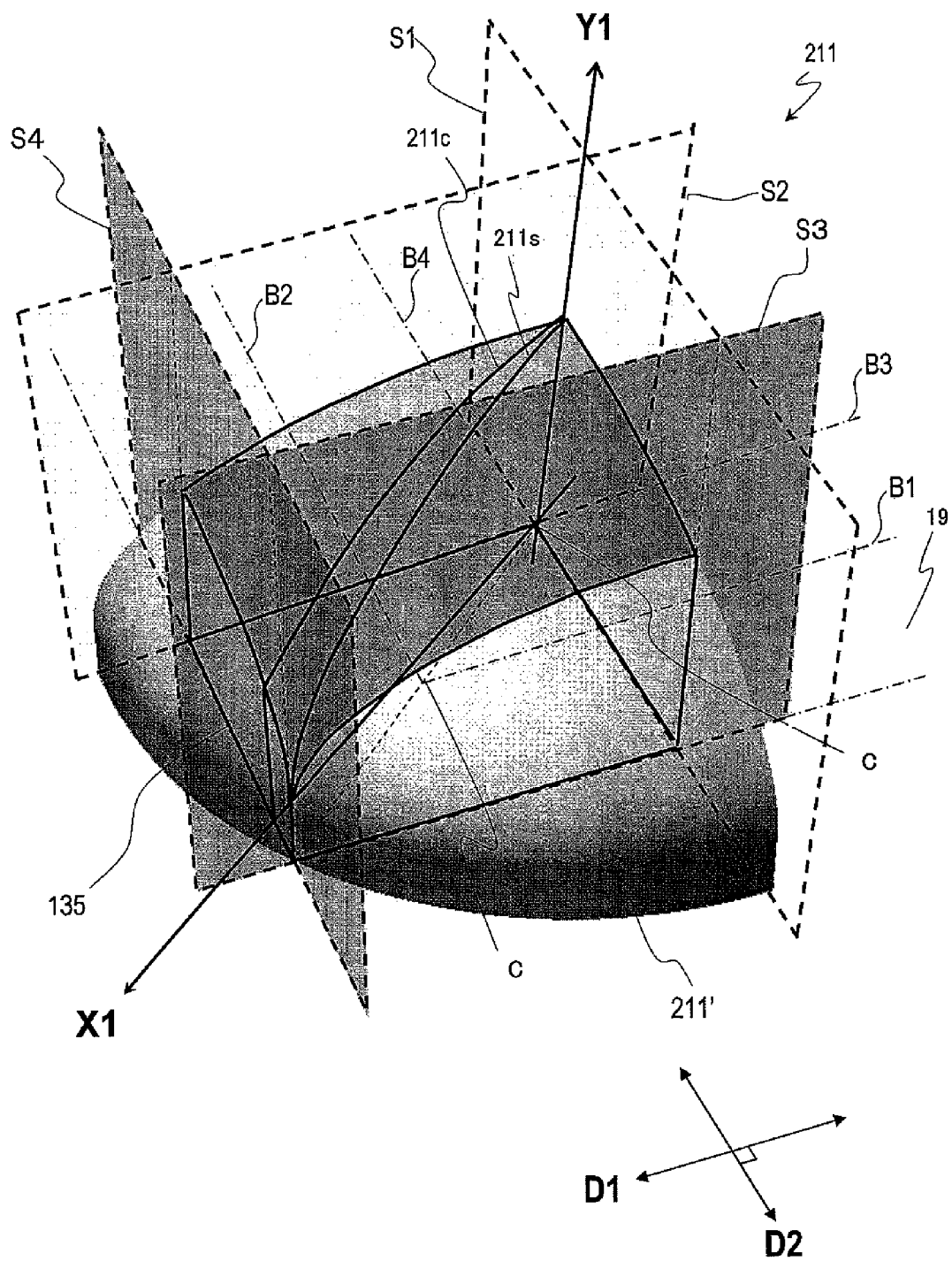
[FIG. 5] A schematic perspective view of a first lens body 211.

FIG. 5 is a schematic perspective view of the first lens body 211. FIG. 5 shows a partial body of revolution 211', which is inclusive of the first lens body 211 and whose axis of revolution is the Y1 axis. The partial body of revolution 211' is a portion of a body of revolution obtained by rotating a plane 211s around the Y1 axis, whose central angle spans 90° (a portion accounting for ¼ of the entirety). The partial body of revolution 211' is obtained by cutting a body of revolution which is obtained by rotating the plane 211s around the Y1 axis at planes S1 and S2. The plane 211s is a plane that contains a point C' at which the first border line B1 and the second border line B2 intersect and contains the Y1 axis. The plane S1 is a plane which contains the Y1 axis and which is perpendicular to the first border line B1, whereas the plane S2 is a plane which contains the Y1 axis and which is perpendicular to the second border line B2. The first lens body 211 has a shape obtained by cutting the partial body of revolution 211' at two planes S3 and S4 which pass through the outer edge 135 of the frame region 130 and which are perpendicular to the display plane 19. The plane S3 passes through a portion of the outer edge 135 extending along the first direction, whereas the plane S4 passes through a portion of the outer edge 135 extending along the second direction. The shape of the plane 211s will be described in detail later.

A line of intersection 211c of the outgoing face of the first lens body 211 with the X1-Y1 plane corresponds to a curve 211c shown in FIG. 3. Since the first lens body 211 is part of a body of revolution whose axis of revolution is the Y1 axis, the line of intersection between the outgoing face of the first lens body 211 and any plane other than the X1-Y1 plane which passes through Y1 and which is perpendicular to the display plane 19 is a similar curve to the line of intersection 211c. Therefore, light going out from each pixel that is anywhere in the first peripheral display section 121 other than on the X1 axis is also refracted in the direction from the point C toward that pixel, similarly to the light shown in FIG. 3 that enters the lens portion 210. As a result, it is possible to obscure the entire first frame portion 131.

It can be said that the first lens body 211 shown in FIG. 5 is a portion of a lens whose viewer-side surface is an axisymmetric curved surface, the portion containing the axis of symmetry and being placed so that the axis of symmetry coincides with the Y1 axis. It can also be said that the viewer-side surface of the first lens body 211 is a portion of an axisymmetric curved surface which is obtained by rotating a curve that is on the plane S1 or a curve that is on the plane S2 around the Y1 axis. Since the body of revolution 211' is a body of revolution, these curves have similar shapes to that of the curve 211c shown in FIG. 3. It can also be said that the first lens body 211 is a portion of a planoconvex lens whose surface is an axisymmetric curved surface.

Since the liquid crystal display panel 100 of the present embodiment is rectangular, the first lens body 211 is defined as a portion of a solid body which is obtained by cutting the body of revolution 211' at the planes S1 and S2 orthogonally intersecting each other. In the case where the liquid crystal display panel 100 is not rectangular, the planes at which to cut the body of revolution 211' may be selected in accordance with the shape of a corner portion of the liquid crystal display panel.

Preferably, the first lens body 211 is designed to refract light in such a manner that, among the plurality of pixels in the first peripheral display section 121, light going out from a number of pixels that exist on a straight line passing through the point C and through the pixel 171 goes out from the viewer-side surface of the first lens body 211 at positions which are at substantially equal intervals. With the first lens body 211 thus designed, it is possible to display an undistorted image in the region composed of the first peripheral display section 121 and the first frame portion 131. This will be described below.

Figure 6:
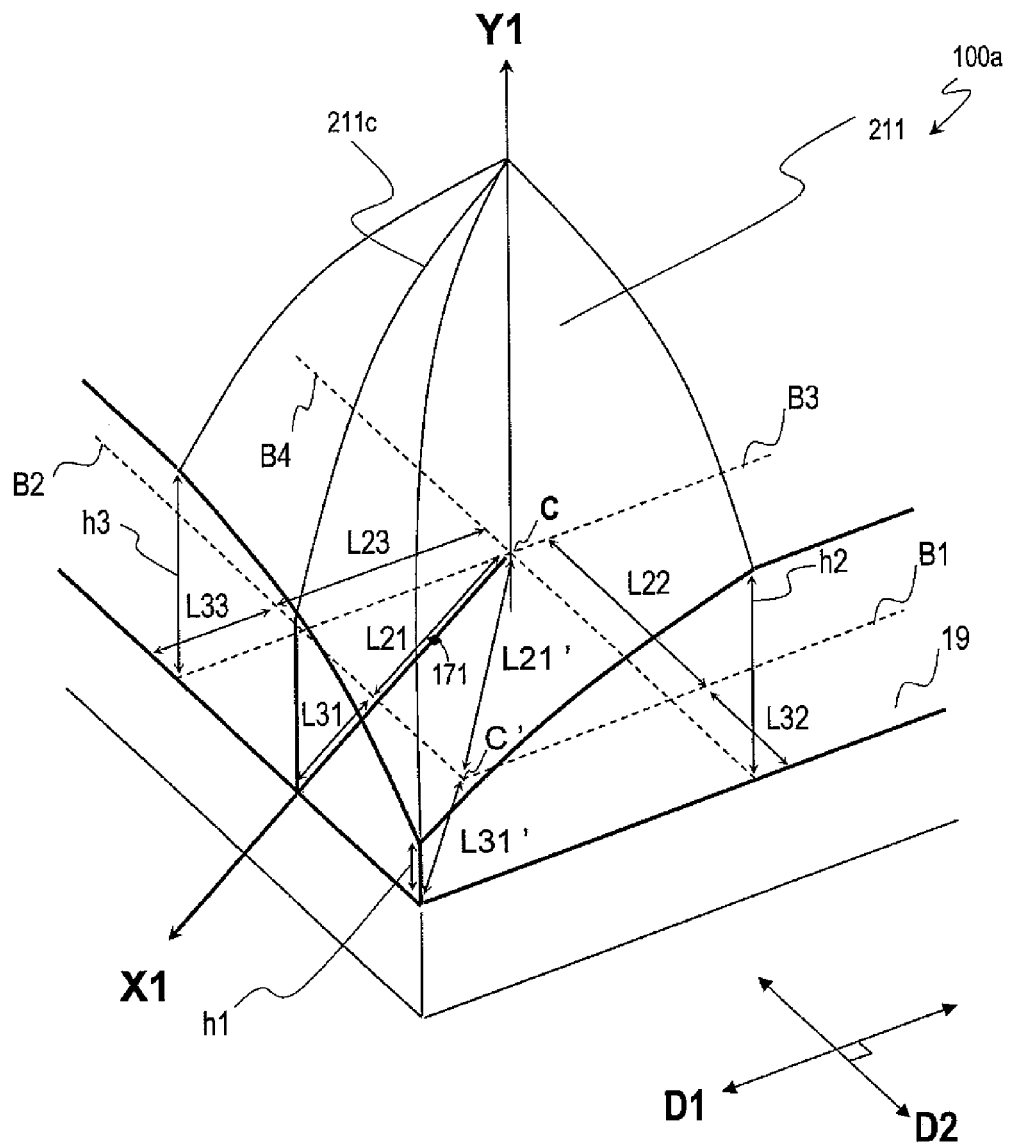

For the sake of explanation, an X1-Y1 coordinate system is set as shown in FIG. 6. FIG. 6 is a perspective view showing, enlarged, the neighborhood of the first lens body 211 of the liquid crystal display device 100a. It is assumed that the X1-Y1 coordinate system has its origin at the point C, at which the third border line B3 and the fourth border line B4 intersect. The X1 axis is an axis passing through the origin C and the center of the pixel 171, whereas the Y1 axis is an axis which passes through the origin C and which is perpendicular to the display plane 19. Hereinafter, any point on the X1-Y1 plane will be expressed as (x, y).

Figure 7:
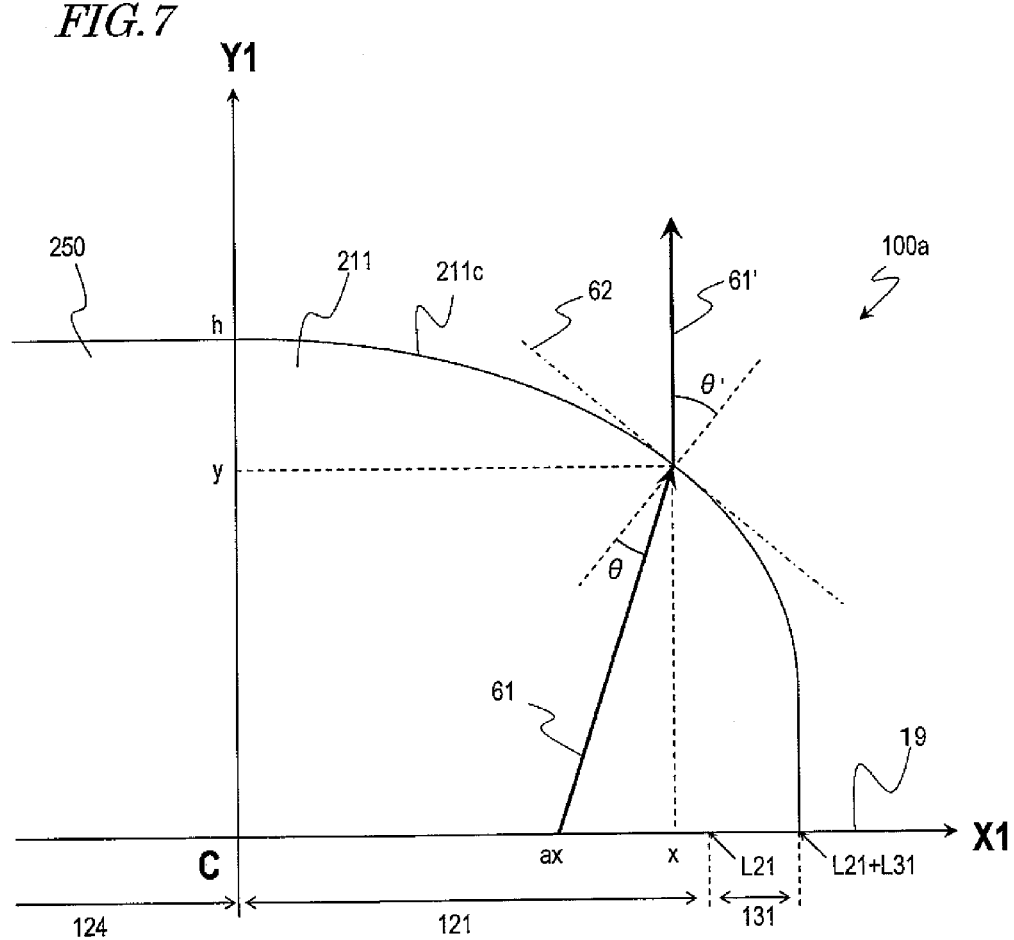
[FIG. 7] A schematic cross-sectional view of the liquid crystal display device 100a in an X1-Y1 plane.

A cross section of the liquid crystal display device 100a in the X1-Y1 plane is shown in FIG. 7. It is assumed that the first peripheral display section 121 has a width L21 along the X1 axis direction, and that the first frame portion has a width L31 along the X1 axis direction. As shown in FIG. 7, the first lens body 211 is placed in the region x=0 to (L21+L31).

Now, an image compression rate a is defined as a=L21/(L21+L31). a is a constant which is determined from the width L21 of the first peripheral display section 121 and the width L31 of the first frame portion, such that 0<a<1. The image compression rate a indicates that an image will be displayed with an 1/a times enlargement on the first lens body 211. In this case, an image to be formed in the first peripheral display section 121 may be compressed by the image compression rate a relative to an image to be formed in the central display region 124, which is preferable because the image displayed on the first lens body 211 will be identical in size to the image displayed on the central display region. It will be appreciated that omission of such a compression will not result in the loss of the effects of the present invention.

A point on the line of intersection 211c between the viewer-side surface of the first lens body 211 and the X1-Y1 plane is expressed as (x, y). A ray 61 going out from a point (ax, 0) on the X1 axis will be considered. It is assumed that the point (ax, 0) is a point within the first peripheral display section 121 (0<ax<L21). As shown in FIG. 7, the ray 61 enters the first lens body 211, passes through the point (x, y), goes out toward the viewer's side, and travels in parallel to the Y axis (ray 61'). In this manner, the first lens body 211 refracts a ray going out from any point on the X1 axis so that the ray will travel in parallel to the Y1 axis (perpendicularly to the display plane 19) from the viewer-side surface. The first lens body 211 is designed so that the x coordinate of the position at which any incident ray passes through the viewer-side surface becomes 1/a times as large.

Figure 8:
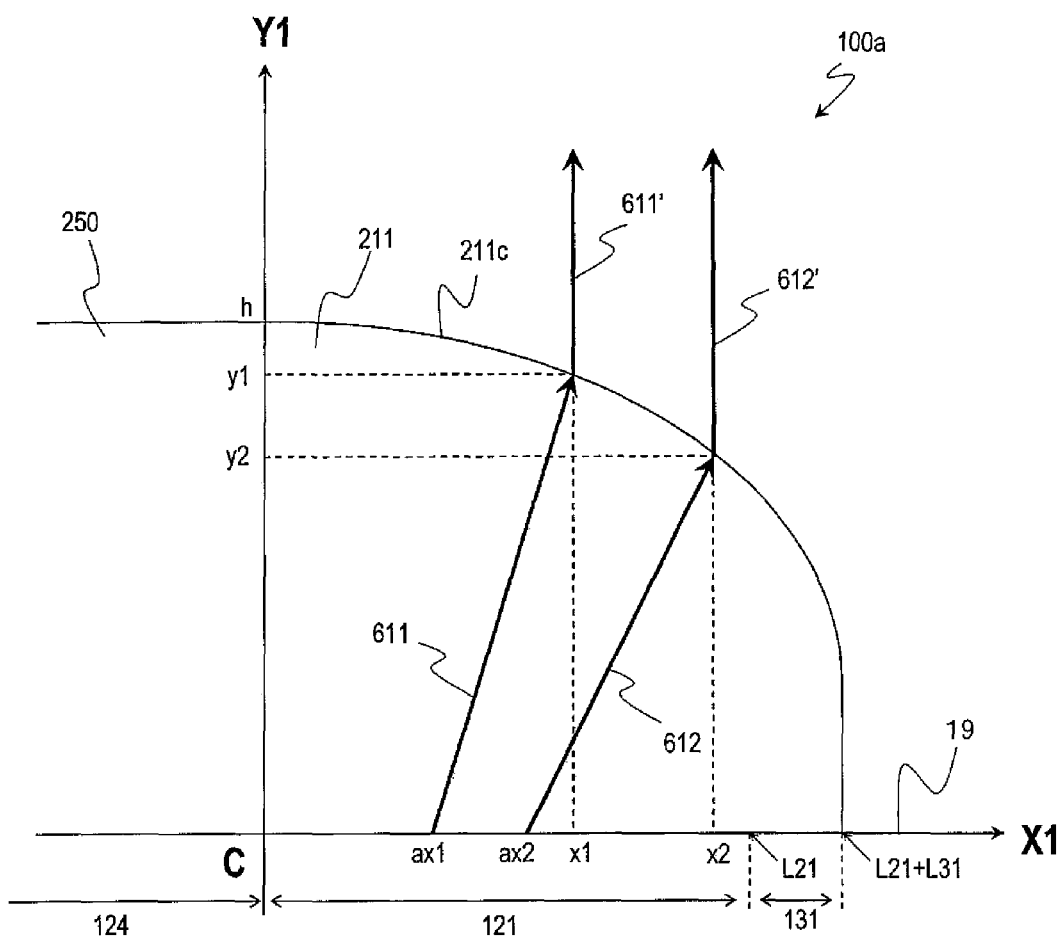
[FIG. 8] A schematic cross-sectional view of the liquid crystal display device 100a in the X1-Y1 plane.

The fact that an undistorted image will be displayed by the first lens body 211 thus designed will be described with reference to FIG. 8. Similarly to FIG. 7, FIG. 8 is a cross-sectional view of the liquid crystal display device 100a in the X1-Y1 plane. A ray 611 going out from the center (ax1, 0) of the pixel 171 in the first peripheral display section 121 and a ray 612 going out from a pixel adjoining the pixel 171 on the positive side along the X1 axis direction will be considered (the pixel 171 not being shown in FIG. 8). It is assumed that the ray 612 goes out from (ax2, 0) (0<ax1<ax2<L21). The ray 611 enters the first lens body 211 and is refracted, passes through a point (x1, y1) on the viewer-side surface, goes out toward the viewer's side, and travels in parallel to the Y1 axis (ray 611'). Similarly, the ray 612 enters the first lens body 211 and is refracted, passes through a point (x2, y2) on the viewer-side surface so as to be emitted toward the viewer's side, and travels in parallel to the Y1 axis (ray 612'). Herein, (x1, y1) is a point on the curve 211c having an X1 coordinate of x1, whereas (x2, y2) is a point on the curve 211c having an X1 coordinate of x2 (0<x1<x2<L21+L31).

The interval between the ray 611 and the ray 612 along the X1 axis direction is ax2−ax1=a×(x2−x1), whereas the interval between the ray 611' and the ray 612' along the X1 axis direction is x2−x1 (where × represents multiplication). In other words, the interval between the rays going out from two adjoining pixels on the X1 axis, as taken along the X1 axis direction, is enlarged by 1/a times when each ray is transmitted through the first lens body 211.

As described above, within the light going out from the first peripheral display section 121, the interval between rays going out from two adjoining pixels on the X1 axis, as taken along the X1 axis direction, is enlarged by 1/a times after transmission through the first lens body 211. Based on similar principles, the interval between rays going out from any two pixels on the X1 axis other than the pixel 171 is also enlarged by 1/a times. Similarly, the interval between rays going out from two pixels within the first peripheral display section 121 that are not on the X1 axis is also enlarged by 1/a times. As a result, an image which is formed in the first peripheral display section 121 of the liquid crystal display panel 100 is enlarged by 1/a times onto the region composed of the first peripheral display section 121 and the first frame portion 131. Therefore, an undistorted image is displayed in the region composed of the first peripheral display section 121 and the first frame portion 131.

By forming the first lens body 211 in a shape obtained by cutting a body of revolution which in turn is obtained by rotating around the Y1 axis a plane figure that is surrounded by the curve 211c, the X1 axis, and the Y1 axis shown in FIG. 7 and FIG. 8, the intervals between rays going out from any two arbitrary pixels in the first peripheral display section 121 can be enlarged by 1/a times, as described above. As a result of this, an image which is formed in the first peripheral display section 121 is enlarged, so that an undistorted image is displayed on the viewer's side of the first peripheral display section 121 and the first frame portion 131.

In order to perform undistorted display as described above, the outgoing face of the first lens body may be designed so that the X1 coordinates of light going out from a number of pixels within the first peripheral display section 121 are uniformly enlarged by 1/a times. In order to perform display completely without distortion, it is necessary that the line of intersection 211c is a curve that is defined by an aspherical function. The solution of an optimum aspherical function can be easily obtained by using optical design software such as LightTools from ORA, but the technique described below can also be employed to derive a function. With reference to FIG. 7, a method of calculating a function representing an optimum shape of the first lens body 211, such that an image formed in the first peripheral display section 121 is enlarged by 1/a times, will be described.

As described above, the ray 61 going out from a point (ax, 0) on the X1 axis enters the first lens body 211. The ray 61 travels in parallel to the Y1 axis through the point (x, y) on the line of intersection 211c between the viewer-side surface of the first lens body 211 and the X1-Y1 plane (ray 61'). The ray 61' is refracted at the point (x, y) according to Snell's law.

Assuming an incident angle of θ, a refraction angle of θ', and a refractive index n of the first lens body 211, the following eq. (1) holds true.

$$\sin\theta' = n\sin\theta \quad (1)$$

An equation f(x) that expresses the line of intersection 211c (x=0 to L21+L31) is assumed. The gradient of a tangential line 62 at an arbitrary point (x, y) on the line of intersection 211c is expressed by f'(x), which is a derivative of f(x), such that the following eq. (2) holds true.

$$f'(x) = -\tan\theta\theta' \quad (2)$$

The gradient of the ray 61 going out from the point (ax, 0) on the X1 axis can also be expressed as follows.

$$\tan(90° + \theta - \theta') \quad (3)$$

Since the ray 61 passes through the point (ax, 0) on the X1 axis and the point (x, y) on the line of intersection 211c, the gradient of the ray 61 can be expressed as follows.

$$y/x(1-a) \quad (4)$$

The function f(x) may be calculated so that eq. (3) and eq. (4) above are equated in a region defined as X=0 to L21+L31.

By using an aspherical function expressed by eq. (5) as the function f(x), a preferable shape of the first lens body 211 is obtained.

$$f(x) = h - cx^2/(1 + (1-(1+k)c^2x^2)^{1/2}) \quad (5)$$

c: curvature of the first lens body 211 (inverse of the radius of curvature R)
h: thickness of the flat plate portion 250
k: conic constant The shape of the graph of the aspherical function represented by f(x) of eq. (5) is determined by the value of the conic constant k. Therefore, in the aspherical function eq. (5), the value of the conic constant k is important. It has been found through a study that the relational expression between the image compression rate a and the conic constant k is expressed by the following eq. (6) (see Japanese Patent Application No. 2008-166458). For reference sake, the entire disclosure of Japanese Patent Application No. 2008-166458 is incorporated herein by reference.

$$k = 89.918a^4 - 194.57a^3 + 159.82a^2 - 57.099a + 7.1865 \quad (6)$$

By designing the first lens body 211 while calculating the conic constant k in accordance with eq. (6), and forming the light-transmitting cover 200, an image which is compressed by the image compression rate a is displayed with a 1/a times enlargement on the first lens body 211, whereby an undistorted image can be displayed on the first lens body 211.

Note that the light-transmitting cover 200 is produced by injection molding using an acrylic resin, for example. Due to manufacturing errors, the resultant light-transmitting cover 200 may have a surface configuration such that its conic constant k does not exactly conform to eq. (6). However, sufficient effects will be obtained so long as the conic constant k of the aspheric surface is generally in accordance with eq. (6). Subjective evaluation may be employed to determine a range where effects are obtained.

Next, a method of determining the optimum conic constant k will be described. A case is considered where, in FIG. 6, the X1 axis is changed to an axis which passes through the point C' (the point where the first border line B1 and the second border line B2 intersect) and the through point C (the point where the third border line B3 and the fourth border line B4 intersect). The length of the first peripheral display section 121 along the X1 axis direction in this case is designated as L21', and the length of the first frame portion 131 along the X1 axis direction is designated as L31'. Now, the image compression rate a=L21/(L21+L31) is constant regardless of which pixel in the first peripheral display section 121 and the point C the X1 axis may pass through. Therefore, by using L21' and L31', the image compression rate a may be expressed as a=L21'/(L21'+L31'). Assuming that L21'=49.9 mm and L31'=9.4 mm, a≈0.841. When a=0.841 is substituted in eq. (6) above, the optimum conic constant k is determined to be 1.46. Thus, the image compression rate a=L21'/(L21'+L31') may be determined upon a straight line which passes through the corner point C' of the display region 120 and a corner of the liquid crystal display panel 100. In other words, what needs to be determined is the position of the point C (the length of L21').

Figure 9:
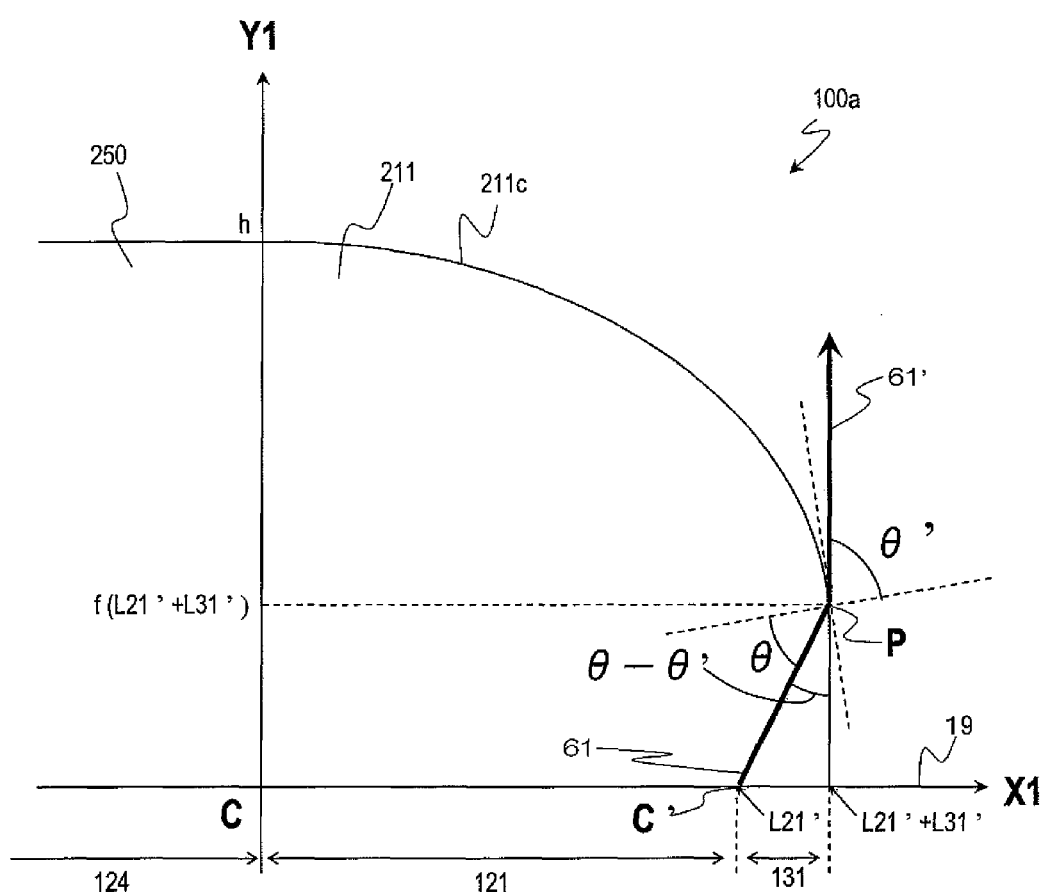
[FIG. 9] A schematic cross-sectional view of the liquid crystal display device 100a in the X1-Y1 plane.

Next, a method of determining the optimum radius of curvature R will be described with reference to FIG. 9. Since the radius of curvature R is expressed as R=1/c by using the curvature c, the radius of curvature R can be determined by determining the curvature c. The curvature c can be determined as follows. FIG. 9 is an X1-Y1 cross-sectional view of the liquid crystal display device 100a in the case where the X1 axis in FIG. 6 is changed to an axis which passes through the point C' and the point C.

A ray 61 going out from the point C' is discussed. Since the point C' corresponds to a point on the outer edge of the first peripheral display section 121, the ray 61 going out from the point C' exits the outer edge of the outgoing face of the first lens body 211 in the normal direction of the display plane 19. This corresponds to, in FIG. 9, a ray from (L21', 0) exiting at the point P (L21'+L31', f(L21'+L31')) on the outgoing face of the first lens body 211 and traveling in parallel to the Y1 axis (ray 61'). The conditions under which the ray 61 going out from the point C' will travel in parallel to the Y1 axis from the point P are determined. From the above eq. (1), eq. (2), and eq. (5) and the determined conditions, a curvature c is determined. By using this curvature c, the optimum radius of curvature R is determined to be 84 mm. Note that the thickness of the flat plate portion 250 is assumed to be h=40 mm. Moreover, the refractive index n of the light-transmitting cover 200 is assumed to be 1.49 (acrylic resin). Note that the calculation of the curvature c described herein can be easily performed by using the aforementioned optical design software.

Next, a preferable range of the image compression rate a will be described. If the image compression rate is low (e.g. a<0.7), the 1/a value will be large, so that each pixel will be greatly enlarged. As a result, the black matrix between pixels may be conspicuous, often resulting in poor displaying. On the other hand, if the image compression rate is high (e.g. a>0.9), a lens portion that is large relative to the width of the frame region will be required, which is not very preferable.

Therefore, the image compression rate a is preferably about 0.7 to about 0.9. By using eq. (6), the conic constant k at the image compression rate a=0.7 or 0.9 is each calculated to be k≈0.38 or 2.4. Thus, the preferable range of the conic constant k can be said to be from 0.38 to 2.4. It will be appreciated that the effects of the present invention will not be lost even outside the aforementioned ranges.

Note that, since the image compression rate a is in the range of 0<a<1, the value of the conic constant k is in the range of 0<k<5.26. This k range is obtained by calculating the k at a=0 or 1 from eq. (6).

By choosing the aforementioned plane 211s to be a plane figure containing a curve that is defined by an aspherical function, and choosing the first lens body 211 to be what is obtained by cutting a body of revolution that is obtained by rotating this plane figure around the Y1 axis, an undistorted image can be displayed in the region composed of the first peripheral display section 121 and the first frame portion 131. That is, since the cross section of the outgoing face of the first lens body 211 is a curve that is defined by an aspherical function, an undistorted image is displayed in the region composed of the first peripheral display section 121 and the first frame portion 131.

In the display region 120, a plurality of pixels are arrayed at equal intervals along the first direction D1 and the second direction D2. When the pixels are arrayed at equal intervals, it is preferable that the display signals that are supplied to pixels which are within the first peripheral display section 121 and are on the X1 axis are uniformly compressed along the X1 axis direction, as compared to display signals that are supplied to pixels within the central display region 124. In this case, the image which is formed by light going out from the pixels that are on the X1 axis is enlarged to the same size as the image which is formed in the central display region 124. As a result of this, it is possible to perform undistorted display across the entire central display region 124, first peripheral display section 121, and first frame portion 131.

Note that compressing the display signals to be supplied to a number of pixels that are on the X1 axis along the X1 axis direction is synonymous to uniformly compressing the display signals with the same compression rate along the first direction D1 and the second direction D2. In the case where the directions that the plurality of pixels are arrayed are not orthogonal to each other, the display signals that are supplied to pixels within the first peripheral display section 121 may be uniformly compressed along a direction which passes through the point C and which is perpendicular to the first border line B1 and along a direction which passes through the point C and which is perpendicular to the second border line B2. In the case where the directions that the plurality of pixels are arrayed are orthogonal to each other, the direction which passes through the point C and which is perpendicular to the first border line B1 coincides with the second direction D2, and the direction which passes through the point C and which is perpendicular to the second border line B2 coincides with the first direction D1.

Figure 10:
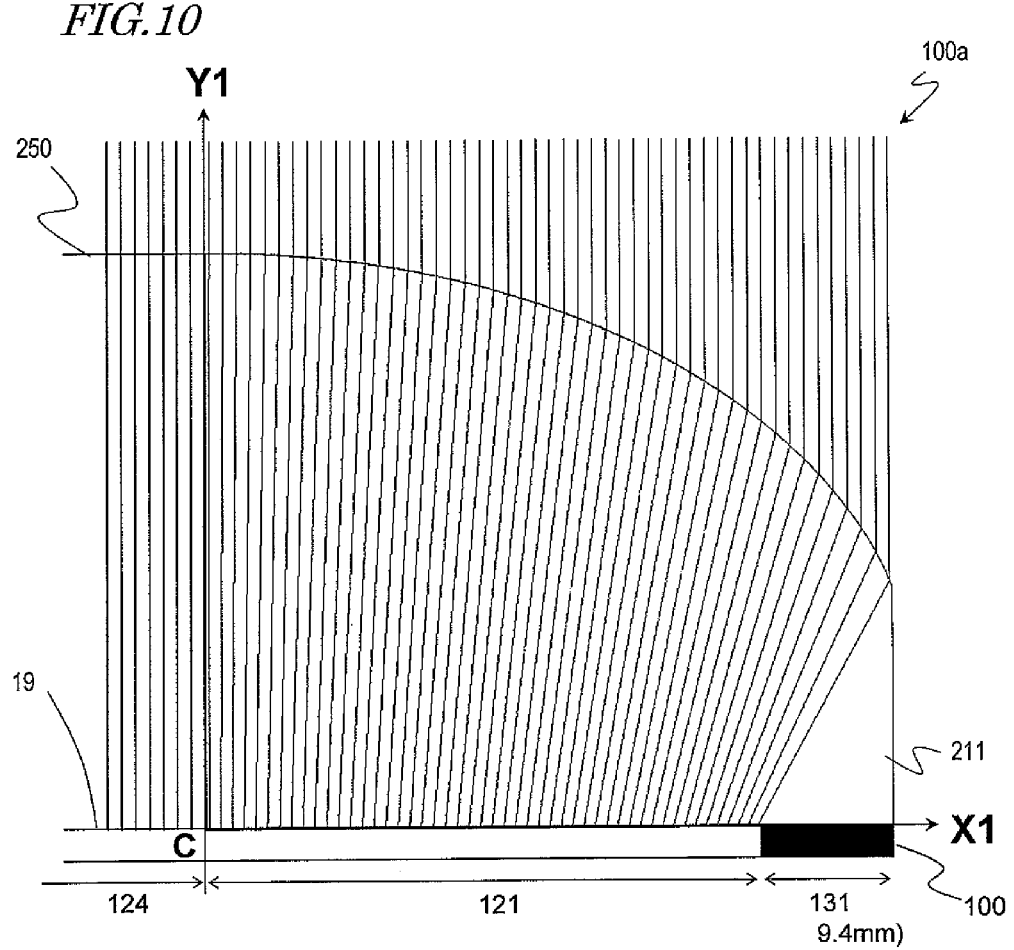

With reference to FIG. 10, a result of a ray-tracing simulation for light which goes out from the liquid crystal display panel 100 and is transmitted through the light-transmitting cover 200 will be described. In the simulation, the outgoing face of the first lens body 211 had a cross-sectional shape which is a curve defined by the aspherical function expressed by eq. (5) above. In eq. (5) above, the conic factor k was 1.46, and the radius of curvature was 84 mm. FIG. 10 shows the ray-tracing simulation result in an X1-Y1 cross section near the first lens body 211.

As shown in FIG. 10, light going out from pixels which are arrayed in the central display region 124 enters the flat plate portion 250, travels straight through the flat plate portion 250 in a direction perpendicular to the display plane 19 so as to be emitted toward the viewer's side, and travels in the direction perpendicular to the display plane 19. Light going out from pixels which are arrayed in the first peripheral display section 121 enters the first lens body 211, and is refracted toward the positive side on the X1 axis and emitted toward the viewer's side, and travels in the direction perpendicular to the display plane 19 of the liquid crystal display panel 100. As a result, an image is displayed on the front face of the first frame portion 131, whereby the first frame portion 131 is obscured.

Moreover, as shown in FIG. 10, light emitted from the outgoing face of the first lens body 211 toward the viewer's side has equal intervals along the X1 axis direction. Moreover, the image which is formed in the first peripheral display section 121 is compressed with the aforementioned image compression rate a, and the intervals of light going out from the outgoing face of the first lens body 211 are equal to the intervals of light going out from the outgoing face of the flat plate portion 250. As a result, an undistorted image is displayed on the viewer's side of the first lens body 211 and the viewer's side of the flat plate portion 250.

Next, a preferable construction for portions other than the corner portions of the liquid crystal display device 100a will be described.

First, with reference to FIG. 2, the portions other than the corner portions of the liquid crystal display panel 100 will be described. In the liquid crystal display panel 100, the peripheral display region 125 further includes second peripheral display section 122 adjoining the first peripheral display section 121, the first border line B1, and the third border line B3 and a third peripheral display section 123 adjoining the first peripheral display section 121, the second border line B2, and the fourth border line B4. Moreover, the frame region 130 further includes a second frame portion 132 adjoining the first frame portion 131 and the first border line B1 and a third frame portion 133 adjoining the first frame portion 131 and the second border line B2.

Next, the overall construction of the light-transmitting cover 200 will be shown, and the construction of portions of the lens portion 210 other than the first lens body 211 will be described. FIG. 11 is a perspective view of the light-transmitting cover 200. The lens portion 210 is provided along two sides extending along the first direction D1 two sides extending along the second direction D2, as well as four corner portions, of the light-transmitting cover 200. The lens portion 210 includes lens bodies 212 and 222 on the two sides extending along the first direction D1, along lens bodies 213 and 223 on the two sides extending along the second direction D2, and lens bodies 211, 221, 231, and 241 in the four corner portions.

Figure 12:
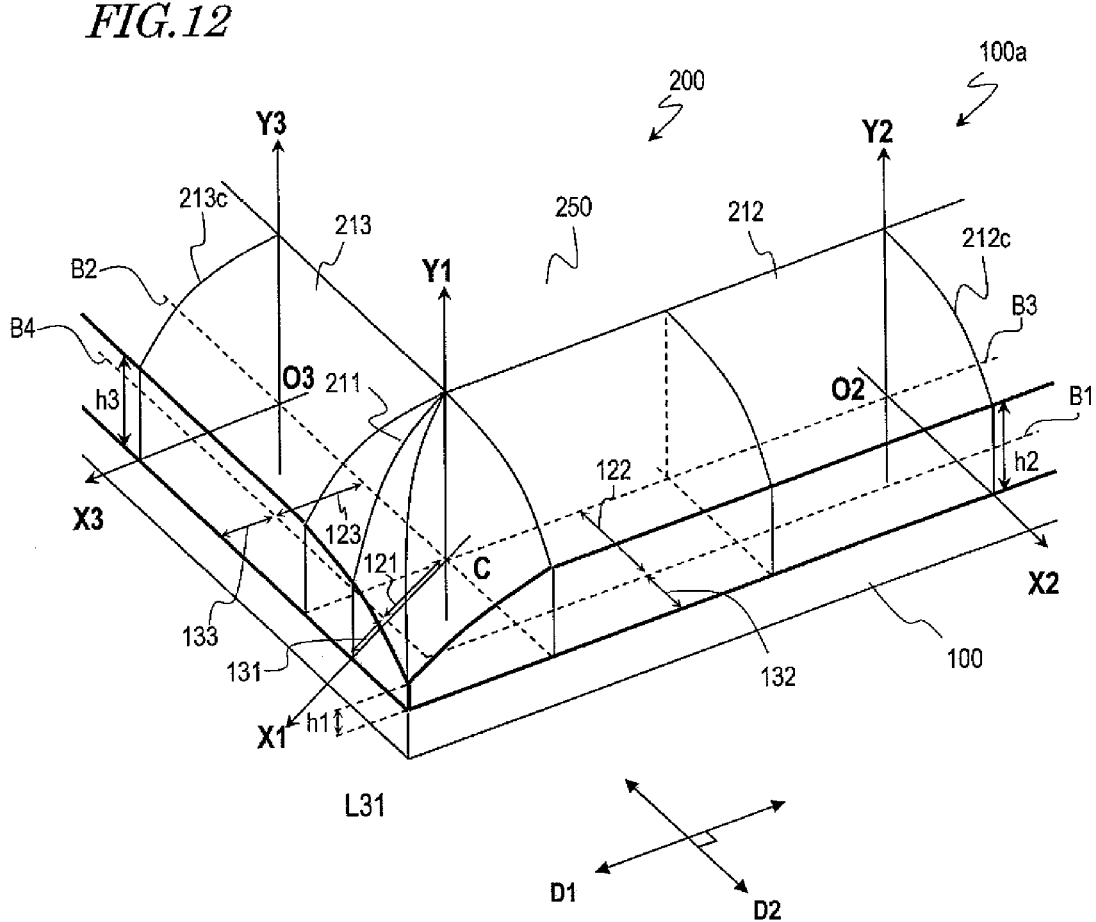

FIG. 12 is a schematic perspective view of the liquid crystal display device 100a showing enlarged the neighborhood of the first lens body 211, which is a corner portion of the lens portion 210. As shown in FIG. 12, the lens body 212 which is provided on the side of the light-transmitting cover 200 extending along the first direction D1 is disposed upon the second peripheral display section 122 and the second frame portion 132 (hereinafter referred to as a second lens body 212). The lens body 213 which is provided on the side extending along the second direction D2 is disposed upon the third peripheral display section 123 and the third frame portion 133 (hereinafter referred to a third lens body 213).

Preferably, the second lens body 212 is designed so as to allow light going out from a plurality of pixels within the second peripheral display section 122 to be refracted in a direction from the second peripheral display section 122 toward the second frame portion 132. In this case, light going out from pixels within the second peripheral display section 122 is emitted from a region composed of the second peripheral display section 122 and the second frame portion 132. As a result, an image which is formed in the second peripheral display section 122 is displayed with enlargement in the region composed of the second peripheral display section 122 and the second frame portion 132, whereby the second frame portion 132 can be obscured.

Figure 13:
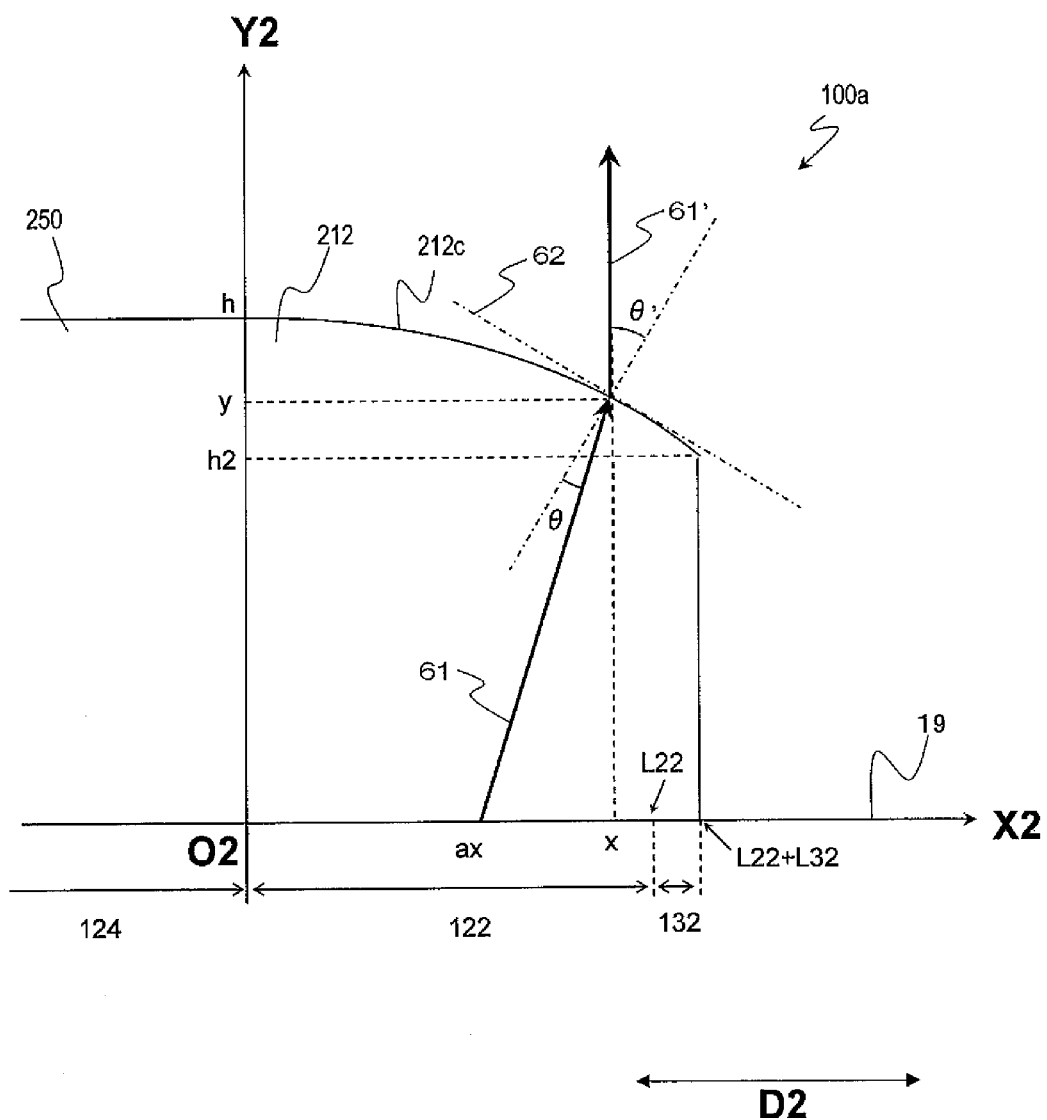
[FIG. 13] A schematic cross-sectional view of the liquid crystal display device 100a in an X2-Y2 plane.

This will be described with reference to FIG. 12 and FIG. 13. As shown in FIG. 12, an origin O2 is set on the third border line B3. An X2 axis is set in the second direction D2 from the origin O2. Furthermore, a Y2 axis is set in a direction perpendicular to the display plane 19 from the origin O2. FIG. 13 shows a cross section in a plane which is perpendicular to the first border line B1 of the second lens body 212. It is assumed that the second peripheral display section 122 has a width L22 along the X2 axis direction, and that the second frame portion 132 has a width L32 along the X2 axis direction. The second lens body 212 is placed in the region x=0 to (L22+L32).

As shown in FIG. 13, similarly to the first lens body 211, a ray 61 going out from (ax, 0) on the X2 axis enters the second lens body 212, passes through the point (x, y) on the outgoing face of the second lens body 212, goes out toward the viewer's side, and travels in parallel to the Y2 axis (ray 61'). In this manner, the second lens body 212 allows light going out from a pixel on the X2 axis to be refracted in the direction from the second peripheral display section 122 toward the second frame portion 132 (i.e., the positive direction on the X2 axis). The second lens body 212 is designed so that the x coordinate of the position at which any incident ray passes through the viewer-side surface is increased by 1/a times. As a result, light going out from a pixel on the X2 axis can be emitted toward the viewer's side in the region x=0 to (L22+L32). As a result, the second frame portion 132 can be obscured.

Figure 14:
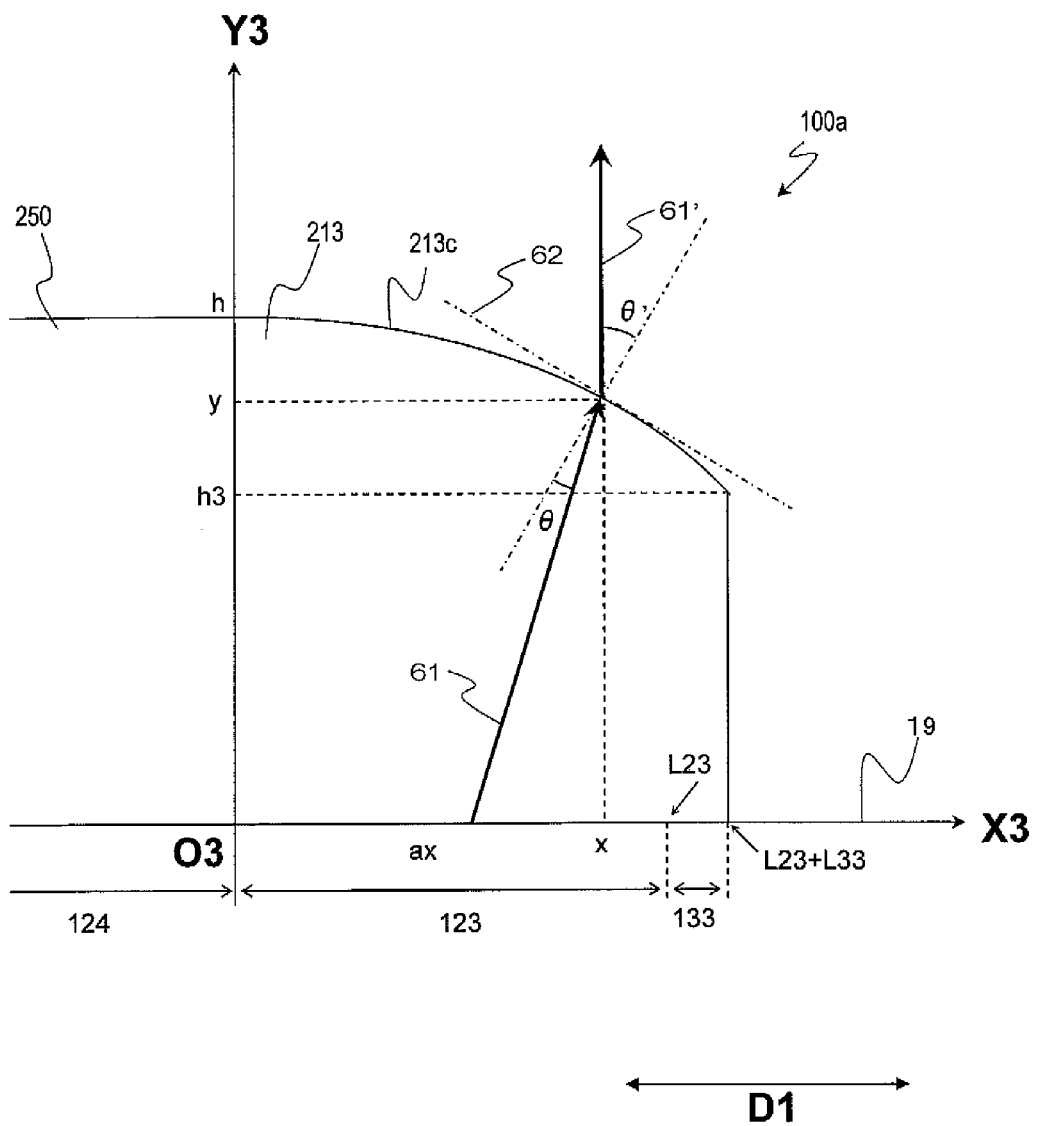
[FIG. 14] A schematic cross-sectional view of the liquid crystal display device 100a in an X3-Y3 plane.

Preferably, the third lens body 213 is designed so as to allow light going out from a plurality of pixels within the third peripheral display section 123 to be refracted in the direction from the third peripheral display section 123 toward the third frame portion 133. In this case, light going out from pixels within the third peripheral display section 123 is emitted from a region composed of the third peripheral display section 123 and the third frame portion 133, so that the third frame portion 133 can be obscured. This will be described with reference to FIG. 14. As shown in FIG. 12, an origin O3 is set on the second border line B2; a Y3 axis is set perpendicularly to the display plane 19 from the origin O3; and an X3 axis is set perpendicularly to the second border line B2 and the Y3 axis through the origin O3. FIG. 14 is a cross-sectional view of the third lens body 213 in an X3-Y3 plane. It is assumed that the third peripheral display section 123 has a width L23 along the X3 axis direction and that the third frame portion 133 has a width L33 along the X3 axis direction. The third lens body 213 is placed in the region x=0 to (L23+L33).

As shown in FIG. 14, similarly to the first lens body 211 and the second lens body 212, a ray 61 going out from (ax, 0) on the X3 axis enters the third lens body 213, passes through the point (x, y) on the outgoing face of the third lens body 213, goes out toward the viewer's side, and travels in parallel to the Y3 axis (ray 61'). In this manner, light going out from a pixel on the X3 axis can be emitted toward the viewer's side in the region x=0 to (L23+L33), whereby the third frame portion 133 can be obscured.

Moreover, it is preferable that the second lens body 212 is designed to refract light in such a manner that light going out from a number of pixels within the second peripheral display section 122 goes out from the outgoing face of the second lens body 212 at positions which are at substantially equal intervals along the X2 axis direction. In this case, as with the first lens body 211, an undistorted image can be displayed on the viewer's side of the second lens body 212.

Moreover, similarly to the second lens body 212, it is preferable that the third lens body 213 is designed to refract light in such a manner that light going out from a number of pixels within the third peripheral display section 123 goes out from the outgoing face of the third lens body 213 at positions which are at substantially equal intervals along the X3 axis direction. As a result, an undistorted image can be displayed on the viewer's side of the third lens body 213.

Moreover, it is preferable that the line of intersection (curve 212c) between the outgoing face of the second lens body 212 and a plane which is perpendicular to the first border line B1, and the line of intersection (curve 213c) between the viewer-side surface of the third lens body 213 and a plane which is perpendicular to the second border line B2, are curves that are defined by the same function as the curve 211c. In this case, if the curve 212c is a curve defined by the aspherical function expressed by eq. (5) above, undistorted display can be performed on the second lens body 212. Similarly, if the curve 213c is a curve defined by the aspherical function, an undistorted image can also be displayed on the third lens body 213. In this case, an undistorted image can be displayed on the entire viewer's side of the first frame portion 131, the second frame portion 132, and the third frame portion 133.

Figure 15:
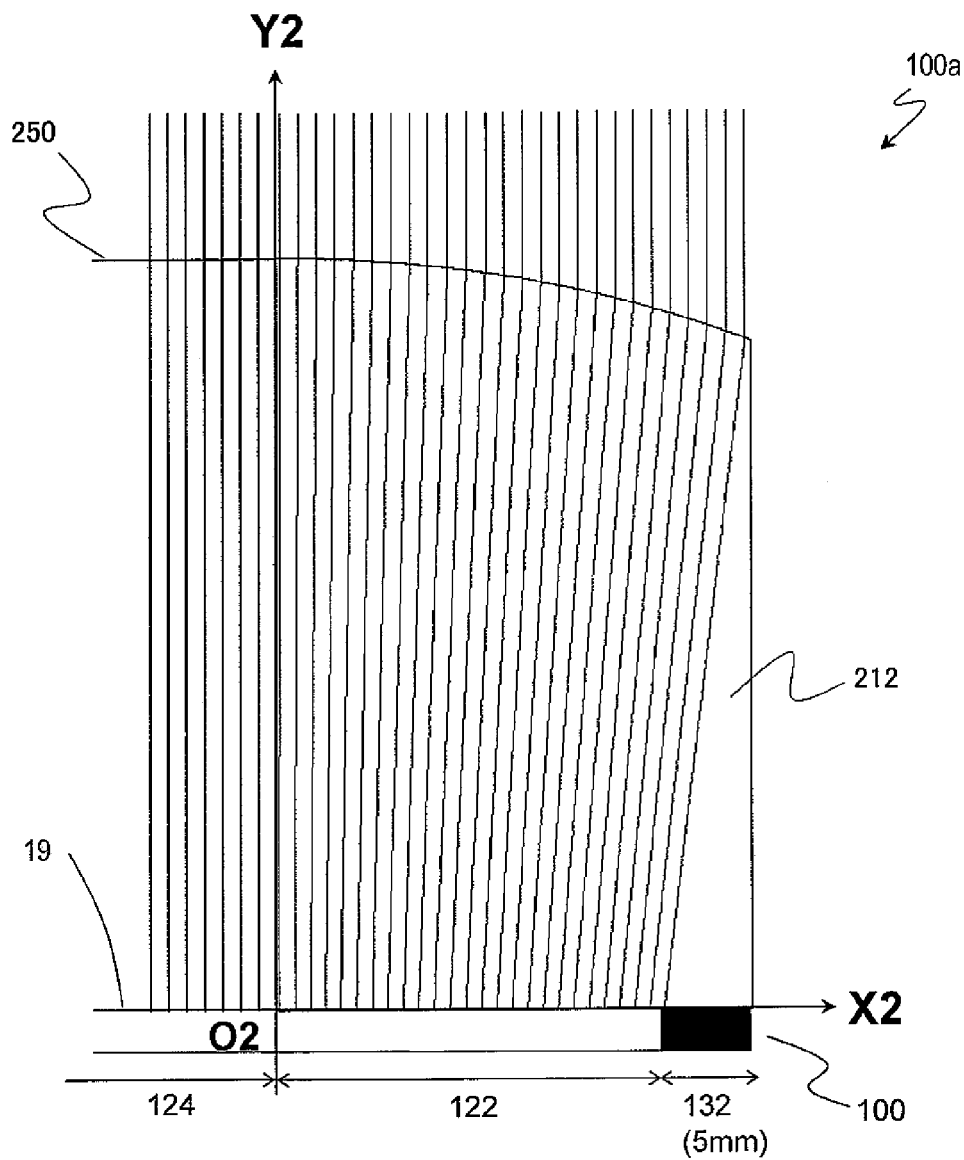

FIG. 15 shows a result of a ray-tracing simulation in an X2-Y2 cross section near the second lens body 212. Similarly to the simulation result in the X1-Y1 cross section shown in FIG. 10, as shown in FIG. 15, light going out from pixels which are arrayed in the second peripheral display section 122 enters the second lens body 212, and is refracted toward the positive side on the X2 axis and emitted toward the viewer's side, whereby the liquid crystal display device 100a can obscure the second frame portion 132. Moreover, as shown in FIG. 15, the intervals of light going out from the outgoing face of the second lens body 212 are equal to the intervals of light going out from the outgoing face of the flat plate portion 250, so that an undistorted image is displayed on the second lens body 212.

Figure 16:
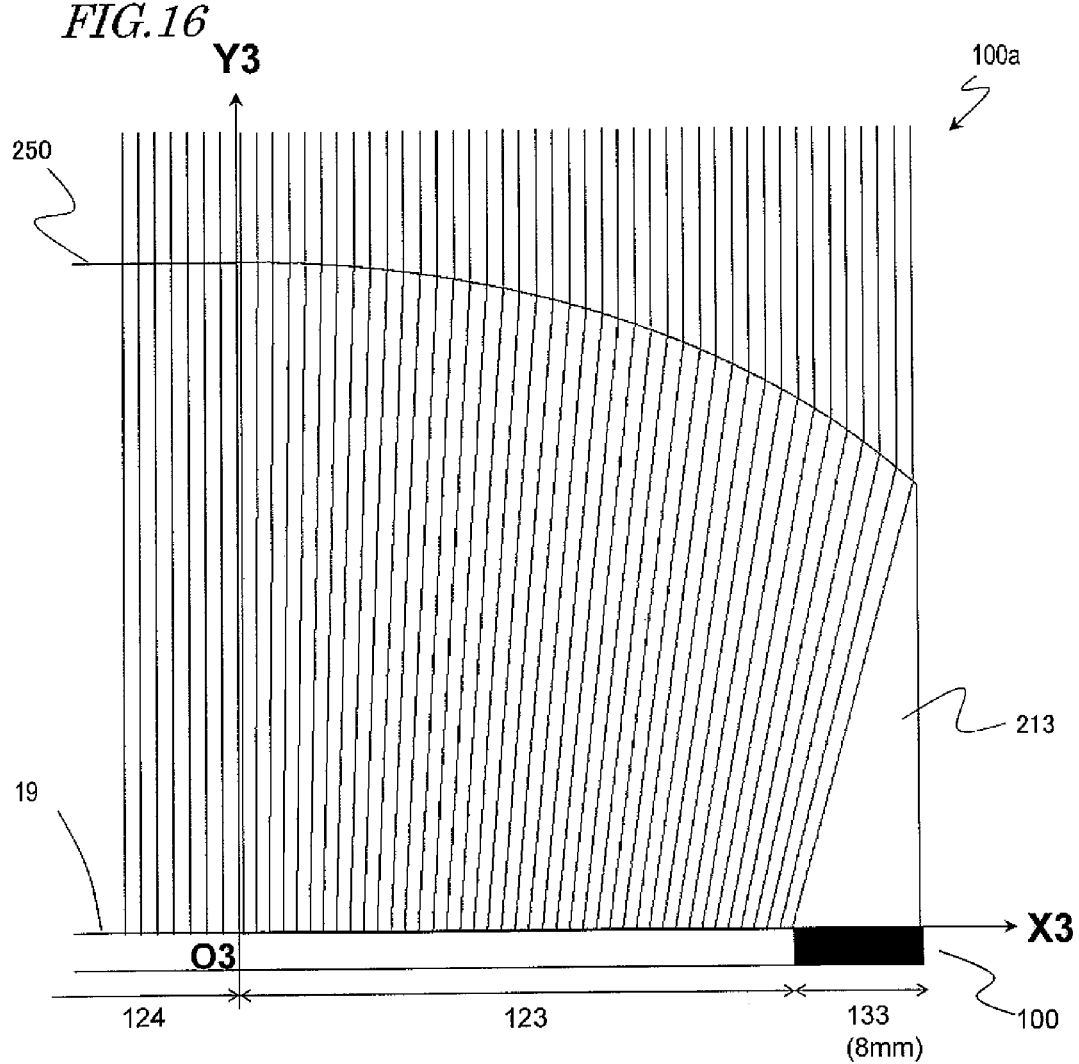

FIG. 16 shows a result of a ray-tracing simulation in an X3-Y3 cross section near the third lens body 213. As shown in FIG. 16, the liquid crystal display device 100a can obscure the third frame portion 133, similarly to the simulation results in the X1-Y1 cross section as shown in FIG. 10 and the X2-Y2 cross section as shown in FIG. 15. Moreover, an undistorted image is displayed on the third lens body 213.

Preferably, display signals that are supplied to pixels which are within the second peripheral display section 122 are uniformly compressed along the second direction D2 by the image compression rate a, as compared to display signals that are supplied to pixels within the central display region 124. Similarly, it is preferable that display signals that are supplied to pixels within the third peripheral display section 123 are uniformly compressed along the first direction D1 by the compression rate a, as compared to display signals that are supplied to pixels within the central display region 124. Preferably, the image compression rate a is designed so that $$a = L21/(L21 + L31)$$
$$= L22/(L22 + L32)$$
$$= L23/(L23 + L33).$$

Herein, any image that is formed in the first peripheral display section 121, the second peripheral display section 122, and the third peripheral display section 123 is enlarged to the same size as the image formed in the central display region 124. As a result, an undistorted image is displayed on the first lens body 211, the second lens body 212, the third lens body 213, and the flat plate portion 250.

In the case where the first direction D1 and the second direction D2 are not orthogonal to each other, display signals that are supplied to pixels within the second peripheral display section 122 may be compressed along a direction which is perpendicular to the first direction D1 by the image compression rate a, and the display signals supplied to pixels within the third peripheral display section 123 may be compressed along a direction which is perpendicular to the second direction D2 by the image compression rate a, whereby an undistorted image can be displayed.

When the light-transmitting cover 200 shown in FIG. 11 is designed so that the lens bodies 221, 231, and 241 are similar in construction to the first lens body 211, that the lens body 222 is similar in construction to the second lens body 212, and that the lens body 223 is similar in construction to the third lens body 213, the liquid crystal display device 100a is able to prevent the frame region 130 from being visually recognized in the entire screen, and an undistorted image can be displayed on the entire screen.

In the liquid crystal display device 100A tiled with liquid crystal display devices 100a as shown in FIG. 4, the non-display region 138 can be obscured, as described above. By the second lens body 212 and the third lens body 213, the non-display region formed near the boundary at which the respective liquid crystal display devices 100a adjoin along the first direction D1 or the second direction D2 can be obscured. As a result of this, the liquid crystal display device 100A can obscure all non-display regions. In other words, the liquid crystal display device 100A can display a jointless image. When each lens body has the aforementioned construction for displaying an undistorted image, a jointless image can be displayed on the entire display plane of the liquid crystal display device 100A without distortion.

Next, design values for the liquid crystal display panel 100a of the present embodiment will be described. The width L21' along the X1 axis direction of the first peripheral display section 121 and the width L31' along the X1 axis direction of the first frame portion 131 are discussed, with respect to the case where the X1 axis in FIG. 6 is chosen to be an axis passing through points C (the point where the third border line B3 and the fourth border line B4 intersect) and C' (the point where the first border line B1 and the second border line B2 intersect). The second peripheral display section 122 has a width L22 along the X2 axis direction and the second frame portion 132 has a width L32 along the X2 axis direction. The third peripheral display section 123 has a width L23 along the X3 axis direction, and the third frame portion 133 has a width L33 along the X3 axis direction. The liquid crystal display panel 100 of the present embodiment is rectangular, and the following relationship exists between L21', L31', L22, L32, L23, and L33.

$$L21'^2 = L22^2 + L23^2$$

$$L31'^2 = L32^2 + L33^2$$

In the liquid crystal display panel 100, the respective parameter values were as follows.

L21'=49.9 mm
L22=26.6 mm
L23=42.5 mm
L31'=9.4 mm
L32=5 mm
L33=8 mm

Moreover, the flat plate portion 250 had a thickness h=40 mm. Note that the aforementioned optimum conic factor k (1.46) and radius of curvature R (84 mm) are values calculated on the basis of the above values.

An example of an image which is displayed by the liquid crystal display device 100a is shown in FIG. 17. FIG. 17(a) is a schematic diagram showing an image which is formed in the display region 120 of the liquid crystal display panel 100. FIG. 17(b) is a schematic diagram showing an image which is displayed on the viewer's side of the light-transmitting cover 200. Note that the curved shape of the lens portion 210 is omitted from illustration in FIG. 17(b).

As shown in FIG. 17(a), as compared to a character A4 that is displayed in the central display region 124, a character A1 that is displayed in the first peripheral display section 121 is uniformly compressed along the first direction D1 and the second direction D2. Moreover, a character A2 that is displayed in the second peripheral display section 122 is uniformly compressed along the second direction D2 as compared to the character A4. A character A3 that is displayed in the third peripheral display section 123 is uniformly compressed along the first direction D1.

As shown in FIG. 17(b), when the light-transmitting cover 200 is placed on the viewer's side of the liquid crystal display panel 100, the character A1 (FIG. 17(a)) is visually recognized by the viewer as a character A1' which is enlarged by the first lens body 211 along the first direction D1 and the second direction D2. Moreover, the character A2 is visually recognized as a character A2' which is enlarged by the second lens body 212 along the second direction D2, whereas the character A3 is visually recognized as a character A3' which is enlarged by the third lens body 213 along the first direction D1. The character A4 is visually recognized as a character A4' on the viewer's side of the flat plate portion 250. The characters A1', A2', A3', and A4' are all displayed in the same size. Thus, the liquid crystal display device 100A is able to display an undistorted image while obscuring the frame region 130.

Next, the relationship between the lengths of the outer edges of the first lens body 211 and the widths of the frame portions will be described. As shown in FIG. 6, it is assumed that the corner portion of the first lens body 211 has a length h1. It is also assumed that, in a cross section in the plane which passes through the point C and which is perpendicular to the first border line B1, the outer edge of the first lens body 211 has a length h2. It is also assumed that, in a cross section in the plane which passes through the point C and which is perpendicular to the second border line B2, the outer edge of the first lens body 211 has a length h3. In the liquid crystal display panel 100, the width L32 of the second frame portion 132 is smaller than the width L33 of the third frame portion 133 (FIG. 2). In this case, since the first lens body 211 is a portion of a body of revolution as described above, h2>h3. Moreover, as shown in FIG. 6, h2>h1 and h3>h1. In the case where L32 is greater than L33, h2<h3. Moreover, even in the case where the shape of the first lens body 211 is not a portion of a body of revolution as described above, distortion can be reduced when h2>h1 and h3>h1.

As described above, in the present embodiment, the display signals that are supplied to pixels within the peripheral display region 125 are compressed. Compression of display signals is realized by software, for example. Another method of image compression is a method of varying the intervals between pixels within the peripheral display region 125 along the first direction D1 or the second direction D2, for example. This is a method of making the pixel interval in the peripheral display region 125 narrower than the pixel interval in the central display region 124, thus creating a compressed image without performing signal processing. Although this method does not require any special signal processing, it is necessary to previously fabricate specially-designed display panels, thus resulting in problems such as poor versatility and cost. In the display device of the present embodiment, the pixels are arrayed at an equal interval across the entire display region 120, thus providing an advantage of a simple structure free of the aforementioned problems.

An image to be formed in the first peripheral display section 121 needs to be compressed along two directions. As a method of compressing an image along two directions, there is also a method where pixels are arrayed at an equal interval and a display signal is compressed at different compression ratios along the first direction D1 and along the second direction D2 to create a compressed image in the first peripheral display section 121. The liquid crystal display device 100a is designed so that the shape of the first lens body 211 is a portion of a body of revolution, thus allowing an image to be uniformly enlarged along the first direction D1 and the second direction D2, and therefore display signals also may be compressed at a constant compression rate along the first direction D1 and the second direction D2, whereby an advantage of simplifying the signal processing is provided.

Next, luminance uniformization will be described. Within the light which goes out from the liquid crystal display device 100a, light going out from pixels within the peripheral display region 125 is enlarged by the lens portion 210, and therefore has its luminance decreased in accordance with the enlargement rate (1/a) thereof. Therefore, a luminance difference occurs between the image which is displayed on the lens portion 210 and the image which is displayed on the flat plate portion 250.

Such a luminance difference can be improved by increasing the luminance of the light entering the lens portion 210 relative to the luminance of the light entering the flat plate portion 250. This is realized by increasing the luminance of the light going out from the peripheral display region 125 relative to the luminance of the light going out from the central display region 124.

In the case of the liquid crystal display device 100a illustrated herein, the two following methods are conceivable.

Method a: Decrease the transmittance of the pixels within the central display region 124.

Method b: Make the luminance of the light going out from the pixels within the peripheral display region 125 higher than the luminance of the light going out from the pixels within the central display region 124.

Method a can be easily realized by adjusting the voltage which is supplied to the pixels. As for Method b, in the case where cold-cathode tubes are provided as the backlight device 15, for example, those cold-cathode tubes disposed corresponding to the peripheral display region 125 may be activated so as to be brighter than the other cold-cathode tubes (cold-cathode tubes disposed corresponding to the central display region 124). A similar method can also be used in the case where light-emitting diodes (LEDs) are arranged side by side as the backlight device 15. It will be appreciated that the above Methods a and b may be combined to perform luminance uniformization.

In the case where the display panel is a self-light-emitting type display panel such as a plasma display panel (PDP) or an organic EL display panel (OLED), the luminance of those pixels which emit light entering the flat plate portion 250 may be made relatively small.

Figure 18:
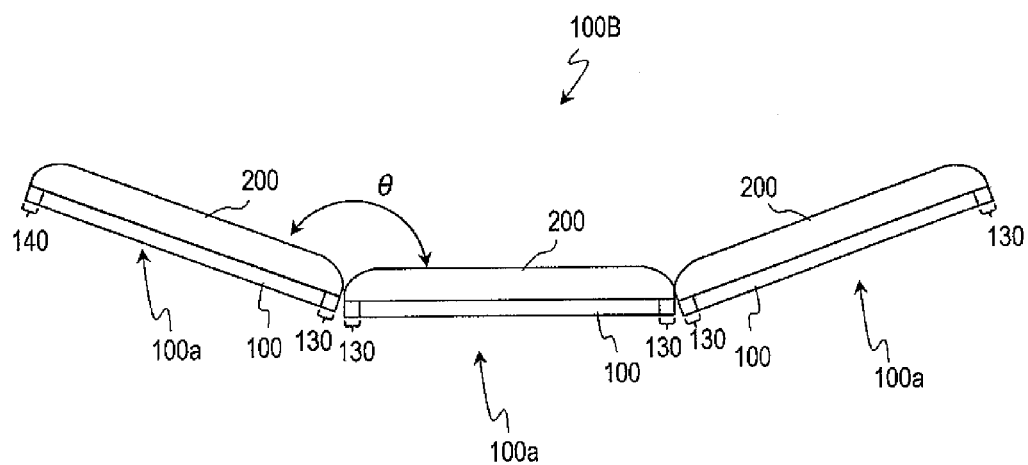
[FIG. 18] A schematic cross-sectional view of a curved-surface display device 100B.

Next, another embodiment of a large-screen display device which is tiled with a plurality of liquid crystal display devices 100a will be illustrated. Although FIG. 4 shows a display device which is tiled with liquid crystal display devices 100a in two directions, the liquid crystal display devices 100a of the present embodiment may be tiled in one direction of either the first direction D1 or the second direction D2. Jointless displaying can also be realized in a display device which is tiled with liquid crystal display devices 100a in one direction. In the case where the liquid crystal display panels 100 are disposed so as to adjoin each other along the first direction D1, for example, such that the light-transmitting covers 200 are disposed so as to adjoin each other along the first direction D1, jointless displaying can be achieved by disposing the third lens bodies 213 of the light-transmitting covers 200 of adjoining liquid crystal display devices 100a so as to adjoin each other. Moreover, as in a liquid crystal display device 100B shown in FIG. 18, the liquid crystal display panels 100a may be arranged with angles θ which are less than 180 degrees. As a result, a curved-surface display device whose joints are obscured is realized. Note that the angle θ is an angle constituted by the viewer-side surfaces of the light-transmitting covers 200 of two adjoining liquid crystal display devices 100a. It will be appreciated that the liquid crystal display panels 100 may be disposed so as to adjoin each other along the second direction D2.

Although the present embodiment illustrates a case where a rectangular liquid crystal display panel 100 is used as the display panel, the present invention is also applicable to a non-rectangular display panel. The present invention is also applicable to the case where non-rectangular display panels are used for tiling. Although liquid crystal display panels are employed in the present embodiment, display panels according to the present invention are not limited to liquid crystal display panels. Moreover, a self-light-emitting type display device lacking a backlight device is also applicable.

Although the above illustrates a light-transmitting cover 200 all of whose four sides are lens-shaped, the present invention is also applicable to the case where three sides or two sides are lens-shaped, so long as the corner portions need to take lens shapes.

Although the light-transmitting cover 200 is made of an acrylic resin in the present embodiment, this is certainly not a limitation. Any light-transmitting material can be used, e.g., a transparent resin such as polycarbonate, or glass.

The method of fixing the light-transmitting cover 200 and the liquid crystal display panel 100 may be any fixation method so long as appearance is not undermined. For example, the side face of the liquid crystal display panel 100 and the side face of the light-transmitting cover 200 may be fixed via a pressure sensitive adhesive sheet. Moreover, a double-sided adhesive sheet may be attached on the frame of the liquid crystal display panel 100 to fix the light-transmitting cover 200. The most aesthetic method is a method of attaching together the liquid crystal display panel 100 and the light-transmitting cover 200 in a manner of avoiding an air layer, by using e.g. a double-sided adhesive sheet, silicone gel, liquid adhesive, or the like which has a refractive index close to the refractive index of the material of the light-transmitting cover 200 and the refractive index of the material of any member (e.g., a polarizer) that is disposed on the outermost surface of the liquid crystal display panel 100 (usually about 1.5) and which is highly light-transmissive. In this case, the difference between the refractive index of the double-sided adhesive sheet or the like used and the refractive index of the light-transmitting cover is preferably 0.1 or less. According to this method, the interface reflection between the outermost surface of the viewer's side of the liquid crystal display panel 100 and the surface of the liquid crystal display panel 100 of the light-transmitting cover 200 is reduced to about 0.1% or less, whereby a good display quality is provided.

Figure 19:
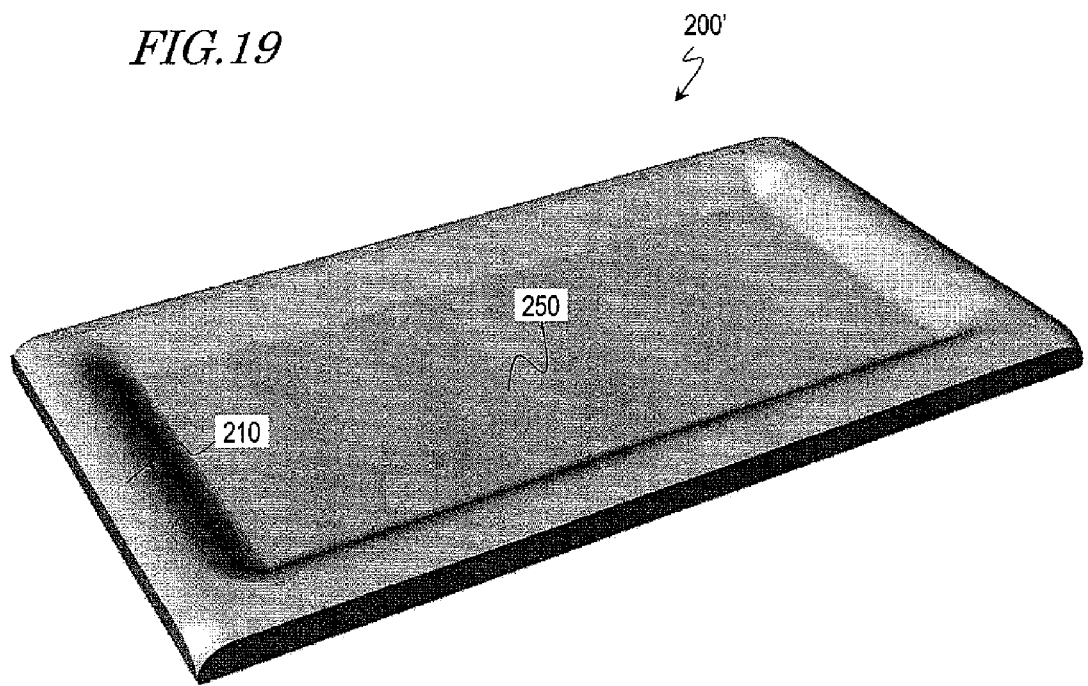
[FIG. 19] A schematic perspective view of a light-transmitting cover 200'.
Figure 20:
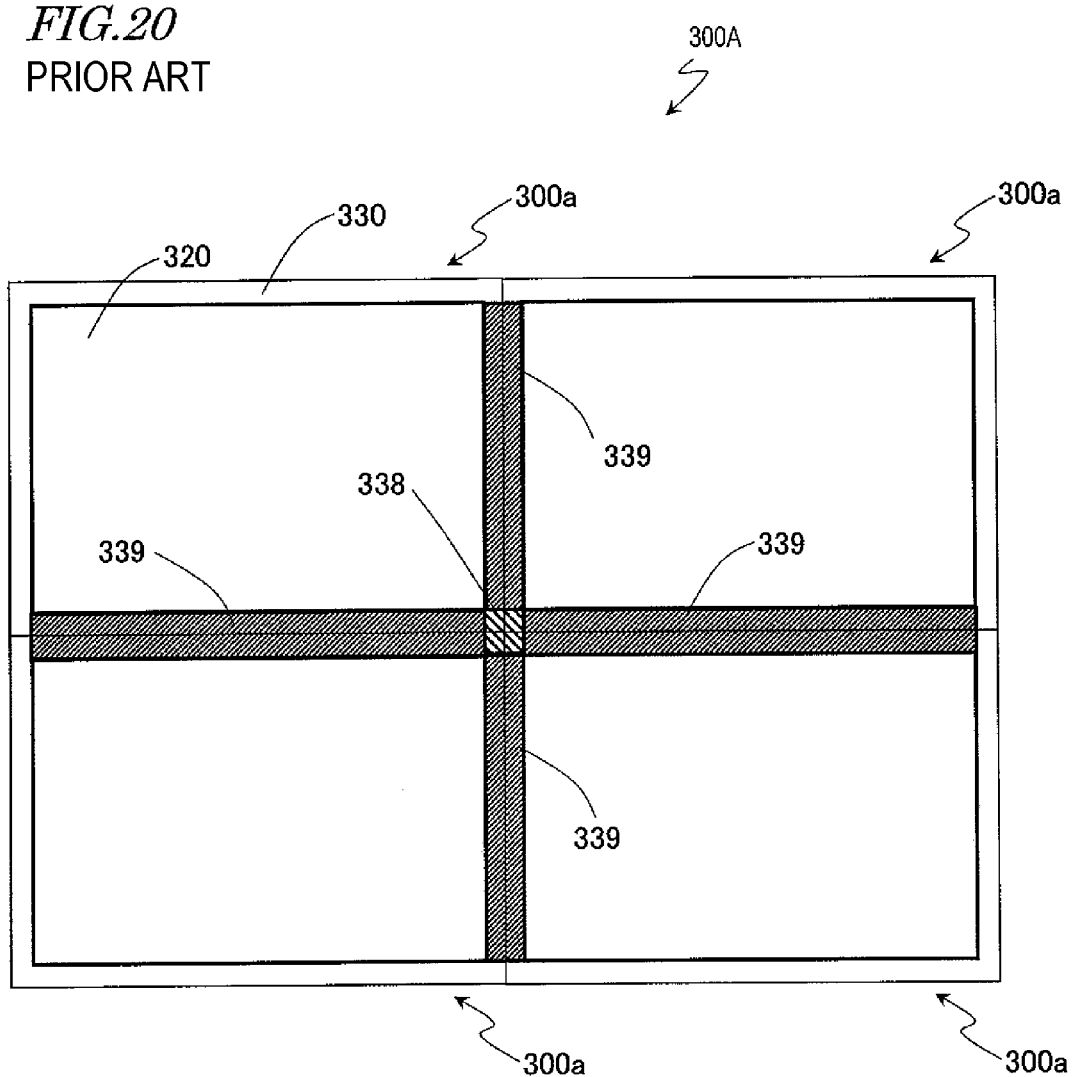
[FIG. 20] A schematic upper plan view of a display device 300A.

Next, another embodiment of the flat plate portion 250 will be described with reference to FIG. 19. FIG. 19 is a perspective view of a light-transmitting cover 200'. In the light-transmitting cover 200' shown in FIG. 19, the thickness of the flat plate portion 250 is smaller than the thickness of the lens portion 210. The light-transmitting cover 200' has an advantage in that it is thin and light-weight as compared to the light-transmitting cover 200 described with reference to FIG. 11.

Although the lens portion 210 of the light-transmitting cover 200 of the present embodiment is illustrated as having a curved surface on the viewer's side, the curved surface of the lens portion 210 is not limited thereto. The lens portion 210 may have a curved surface on the opposite side of the viewer's side, or curved surfaces may be provided on both the viewer's side and the opposite side of the viewer's side. When both of the front and rear faces of the lens portion are curved surfaces, light entering the lens portion is refracted twice before going out. Therefore, as compared to the case where only one face is curved, an advantage is provided in that the light-transmitting cover can be made thin and light-weight. Moreover, in the case where the lens portion has a curved surface only on the opposite side of the viewer's side, i.e., the viewer-side surface of the lens portion is a flat face and the rear surface of the lens portion is a curved surface, an advantage is provided in that any dust, soil or the like that is attached on the viewer-side surface is easily wiped off.

As described above, according to the present invention, there is provided a direct-viewing type display device which can display a jointless image even when tiled in two directions with a plurality of display devices.

Industrial Applicability

The present invention is suitably used as a television set or as a display device for displaying information.

| REFERENCE SIGNS LIST | |
| --- | --- |
| 11, 12 | substrate |
| 13 | liquid crystal layer |
| 15 | backlight device |
| 16 | sealing portion |
| 19 | display plane of display panel |
| 100 | liquid crystal display panel |
| 100a, 100A, 100B | liquid crystal display device |
| 120 | display region |
| 121, 122, 123 | peripheral display section |
| 124 | central display region |
| 125 | peripheral display region |
| 130 | frame region |
| 131, 132, 133 | frame portion |
| 200, 200' | light-transmitting cover |
| 210 | lens portion |
| 211, 212, 213 | lens body |
| 250 | flat plate portion |
| B1, B2, B3, B4 | border line |

-continued

REFERENCE SIGNS LIST

| | |
|---|---|
| D1 | first direction |
| D2 | second direction |
| L21, L22, L23 | width of peripheral display section |
| L31, L32, L33 | width of frame portion |

The invention claimed is:

1. A direct-viewing type display device comprising:
at least one display panel having a display region including a matrix array of a plurality of pixels arranged along a row direction and a column direction and a frame region provided outside the display region, such that a first border line extending along the row direction and a second border line intersecting the first border line and extending along the column direction exist between the display region and the frame region; and
at least one light-transmitting cover disposed on a viewer's side of the at least one display panel, wherein,
the display region is composed of a peripheral display region adjoining the frame region and a central display region, the central display region defining a region other than the peripheral display region;
a third border line extending along the row direction and a fourth border line intersecting the third border line and extending along the column direction exist between the peripheral display region and the central display region;
the peripheral display region includes a first peripheral display section surrounded by a straight line passing through a point where the third border line and the fourth border line intersect and orthogonally intersecting the first border line, a straight line passing through the intersecting point and orthogonally intersecting the second border line, the first border line, and the second border line;
the at least one light-transmitting cover includes a lens portion disposed over the peripheral display region and the frame region, the lens portion allowing light going out from at least one pixel within the first peripheral display section to be refracted in a direction from the intersecting point toward the at least one pixel;
the frame region includes a first frame portion surrounded by a straight line passing through the intersecting point and orthogonally intersecting the first border line, a straight line passing through the intersecting point and orthogonally intersecting the second border line, the first border line, the second border line, and an outer edge of the frame region;
the lens portion includes a first lens body disposed over the first peripheral display section and the first frame portion; and
the first lens body is a portion of a solid obtained by cutting a body of revolution in two planes containing an axis of revolution, the axis of revolution passing through the intersecting point and being perpendicular to the third border line and the fourth border line.

2. The display device of claim 1, wherein the first lens body refracts light in such a manner that, among a plurality of pixels within the first peripheral display section, light going out from a plurality of pixels which are on a straight line passing through the intersecting point and the at least one pixel goes out from a viewer-side surface of the first lens body at positions which are at substantially equal intervals.

3. The display device of claim 2, wherein a line of intersection between a plane passing through the intersecting point and the at least one pixel and being perpendicular to a display plane of the at least one display panel and a surface of the first lens body is a curve defined by an aspherical function.

4. The display device of claim 2, wherein, in the display region, the plurality of pixels are arrayed at equal intervals along the row direction and the column direction; and
a display signal supplied to the at least one pixel is uniformly compressed along a direction passing through the intersecting point and being perpendicular to the first border line and along a direction passing through the intersecting point and being perpendicular to the second border line, as compared to a display signal supplied to a pixel within the central display region.

5. The display device of claim 1, wherein,
the peripheral display region further includes:
a second peripheral display section adjoining the first peripheral display section, the first border line, and the third border line; and
a third peripheral display section adjoining the first peripheral display section, the second border line, and the fourth border line;
the frame region further includes a second frame portion adjoining the first frame portion and the first border line, and a third frame portion adjoining the first frame portion and the second border line;
the lens portion further includes a second lens body disposed over the second peripheral display section and the second frame portion, and a third lens body disposed over the third peripheral display section and the third frame portion;
the second lens body allows light going out from a plurality of pixels within the second peripheral display section to be refracted in a direction from the second peripheral display section toward the second frame portion; and
the third lens body allows light going out from a plurality of pixels within the third peripheral display section to be refracted in a direction from the third peripheral display section toward the third frame portion.

6. The display device of claim 5, wherein,
the second lens body refracts light in such a manner that light going out from a plurality of pixels within the second peripheral display section goes out from a viewer-side surface of the second lens body at positions which are at substantially equal intervals; and
the third lens body refracts light in such a manner that light going out from a plurality of pixels within the third peripheral display section goes out from a viewer-side surface of the third lens body at positions which are at substantially equal intervals.

7. The display device of claim 6, wherein a line of intersection between a surface of the second lens body and a plane perpendicular to the first border line and a line of intersection between a surface of the third lens body and a plane perpendicular to the second border line is a curve defined by a same function as a line of intersection between a surface of the first lens body and a plane perpendicular to a display plane of the at least one display panel.

8. The display device of claim 1, wherein,
the at least one light-transmitting cover further includes a flat plate portion in a portion other than the lens portion, a viewer-side surface of the flat plate portion being composed of a face which is substantially parallel to a display plane of the at least one display panel; and
a thickness of the flat plate portion is smaller than a thickness of the lens portion.

9. The display device of claim 5, wherein,
the at least one display panel includes two or more display panels adjoining one another along the row direction;
the at least one light-transmitting cover includes two or more light-transmitting covers adjoining one another along the row direction; and
the third lens bodies of the two or more light-transmitting covers adjoin one another along the row direction.

10. The display device of claim 5, wherein,
the at least one display panel includes four or more display panels adjoining one another along the row direction and the column direction;
the at least one light-transmitting cover includes four or more light-transmitting covers adjoining one another along the row direction and the column direction; and
the first lens bodies of the four or more light-transmitting covers adjoin one another.

11. The display device of claim 9, wherein the two or more display panels are set so that an angle between any adjoining display planes along the row direction is an angle less than 180°.

\* \* \* \* \*